United States Patent
Moon et al.

(10) Patent No.: US 10,713,670 B1
(45) Date of Patent: Jul. 14, 2020

(54) METHOD AND SYSTEM FOR FINDING CORRESPONDENCE BETWEEN POINT-OF-SALE DATA AND CUSTOMER BEHAVIOR DATA

(71) Applicants: Hankyu Moon, Oak Park, CA (US); Rajeev Sharma, State College, PA (US); Satish Mummareddy, San Francisco, CA (US)

(72) Inventors: Hankyu Moon, Oak Park, CA (US); Rajeev Sharma, State College, PA (US); Satish Mummareddy, San Francisco, CA (US)

(73) Assignee: VideoMining Corporation, State College, PA (US)

( * ) Notice: Subject to any disclaimer, the term of this patent is extended or adjusted under 35 U.S.C. 154(b) by 676 days.

(21) Appl. No.: 14/986,386

(22) Filed: Dec. 31, 2015

Related U.S. Application Data

(66) Substitute for application No. 12/313,635, filed on Nov. 21, 2008, now abandoned.

(51) Int. Cl.
*G06Q 30/02* (2012.01)
*G06Q 20/20* (2012.01)

(52) U.S. Cl.
CPC ......... *G06Q 30/0201* (2013.01); *G06Q 20/20* (2013.01)

(58) Field of Classification Search
CPC ............... G06Q 20/20; G06Q 30/0202; G06Q 30/0203; G06Q 30/0204; G06Q 10/0633; G08B 13/19645; G08B 13/196; G06K 9/00771; G06K 9/00785; G06K 9/00885; G06K 9/00778; G06K 9/00711; G06K 9/00624; G06K 9/00; G06K 9/6226; G06T 7/00; H03M 13/616; H04B 7/0663; G06E 1/045; G06F 17/16; G06F 2101/14
See application file for complete search history.

(56) References Cited

U.S. PATENT DOCUMENTS

| | | | | |
|---|---|---|---|---|
| 5,097,328 A | * | 3/1992 | Boyette | G06Q 10/06 348/150 |
| 5,097,981 A | * | 3/1992 | Degasperi | G07F 9/02 221/231 |
| 5,592,560 A | * | 1/1997 | Deaton | G06Q 20/042 235/375 |
| 5,745,036 A | * | 4/1998 | Clare | G07G 1/0054 235/375 |

(Continued)

*Primary Examiner* — Tyler W Knox

(57) ABSTRACT

The present invention is a method and system to provide correspondences between point-of-sale data registered at the store checkout and shopper behavior data observed at point-of-purchase through video analysis. The point-of-sale data include the list of shoppers and purchase items, and the shopper behavior data include the purchase events along with observed purchase items. The correspondence in the form of checkout shopper IDs matched to purchase event IDs is derived based on the algebraic constraint among the point-of-sale data and the purchase event data. Additional constraint based on shopper tracks and checkout/event times can also be incorporated to the correspondence problem. Uncertainties due to the video measurement can be systematically handled utilizing a Bayesian model.

28 Claims, 21 Drawing Sheets

(56) References Cited

U.S. PATENT DOCUMENTS

| | | | | |
|---|---|---|---|---|
| 5,953,055 A * | 9/1999 | Huang | G06K 9/00228 | 348/149 |
| 5,974,396 A * | 10/1999 | Anderson | G06Q 30/02 | 705/14.25 |
| 6,163,772 A * | 12/2000 | Kramer | G06Q 20/202 | 705/79 |
| 6,334,110 B1 * | 12/2001 | Walter | G06Q 30/02 | 705/14.41 |
| 6,341,269 B1 * | 1/2002 | Dulaney | G06Q 10/087 | 705/22 |
| 6,659,344 B2 * | 12/2003 | Otto | G06K 17/0022 | 235/381 |
| 6,847,393 B2 * | 1/2005 | Ashe | G07G 1/14 | 348/143 |
| 6,976,000 B1 * | 12/2005 | Manganaris | G06Q 30/02 | 705/7.33 |
| 7,006,982 B2 | 2/2006 | Sorenson | | |
| 7,240,824 B2 * | 7/2007 | Stockton | G06Q 20/387 | 235/375 |
| 7,370,033 B1 * | 5/2008 | Roychowdhury | G06Q 30/02 | 707/602 |
| 7,388,495 B2 * | 6/2008 | Fallin | G06Q 20/20 | 235/375 |
| 7,426,479 B2 * | 9/2008 | Otto | G06Q 30/0201 | 235/383 |
| 7,475,024 B1 * | 1/2009 | Phan | G06Q 10/087 | 705/22 |
| 7,672,872 B2 * | 3/2010 | Shanton | A47F 5/11 | 340/5.92 |
| 7,957,565 B1 * | 6/2011 | Sharma | G06K 9/00778 | 382/103 |
| 8,010,402 B1 * | 8/2011 | Sharma | G06Q 10/00 | 705/14.49 |
| 8,219,438 B1 * | 7/2012 | Moon | G06Q 30/0201 | 705/7.29 |
| 8,320,624 B2 * | 11/2012 | Takahata | G06K 9/00295 | 348/169 |
| 8,412,656 B1 * | 4/2013 | Baboo | G06Q 30/0201 | 706/20 |
| 8,432,445 B2 * | 4/2013 | Nagata | G06T 7/194 | 348/143 |
| 8,775,238 B2 * | 7/2014 | Angell | G06Q 30/0207 | 705/14.53 |
| 8,918,851 B1 * | 12/2014 | Iannamico | G06F 21/36 | 726/7 |
| 9,208,678 B2 * | 12/2015 | Albertson | G08B 13/19613 | |
| 9,299,084 B2 * | 3/2016 | Argue | G06Q 30/0201 | |
| 9,600,982 B2 * | 3/2017 | MacIntosh | G06T 7/73 | |
| 9,747,497 B1 * | 8/2017 | Sharma | G06K 9/00771 | |
| 2001/0014868 A1 * | 8/2001 | Herz | G06Q 30/02 | 705/14.38 |
| 2002/0167408 A1 * | 11/2002 | Trajkovic | G06Q 30/06 | 340/573.1 |
| 2002/0178085 A1 * | 11/2002 | Sorensen | G06Q 30/0201 | 705/7.29 |
| 2003/0036936 A1 * | 2/2003 | Steichen | G06Q 10/109 | 705/7.38 |
| 2003/0055707 A1 * | 3/2003 | Busche | G06Q 30/0601 | 705/14.65 |
| 2003/0118216 A1 * | 6/2003 | Goldberg | G07F 17/26 | 382/115 |
| 2003/0132298 A1 * | 7/2003 | Swartz | G07G 3/00 | 235/472.02 |
| 2004/0111454 A1 * | 6/2004 | Sorensen | G06Q 30/02 | 708/200 |
| 2004/0249650 A1 * | 12/2004 | Freedman | G06Q 30/02 | 705/7.29 |
| 2004/0260513 A1 * | 12/2004 | Fitzpatrick | G06Q 30/02 | 702/182 |
| 2005/0102183 A1 * | 5/2005 | Kelliher | G07G 1/0054 | 705/16 |
| 2005/0182673 A1 * | 8/2005 | Marzian | G06Q 30/02 | 705/7.29 |
| 2005/0286774 A1 * | 12/2005 | Porikli | G06K 9/00335 | 382/225 |
| 2006/0200378 A1 * | 9/2006 | Sorensen | G06Q 30/0203 | 705/7.29 |
| 2006/0208070 A1 * | 9/2006 | Kato | G06Q 30/0268 | 235/383 |
| 2007/0043608 A1 * | 2/2007 | May | G06Q 30/0204 | 705/7.27 |
| 2007/0067221 A1 * | 3/2007 | Godsey | G06Q 20/208 | 705/23 |
| 2007/0078869 A1 * | 4/2007 | Carr | G06Q 30/0255 | |
| 2007/0219866 A1 * | 9/2007 | Wolf | G06Q 30/00 | 705/14.43 |
| 2007/0253595 A1 * | 11/2007 | Sorensen | G07C 9/00 | 382/103 |
| 2007/0282665 A1 * | 12/2007 | Buehler | G06Q 30/0201 | 705/7.29 |
| 2008/0018738 A1 * | 1/2008 | Lipton | G08B 13/1968 | 348/143 |
| 2008/0042836 A1 * | 2/2008 | Christopher | G06Q 10/08 | 340/568.1 |
| 2008/0149710 A1 * | 6/2008 | Silverbrook | G06Q 10/00 | 235/383 |
| 2008/0159634 A1 * | 7/2008 | Sharma | G06K 9/00771 | 382/224 |
| 2008/0172261 A1 * | 7/2008 | Albertson | G06K 9/00335 | 382/103 |
| 2008/0252723 A1 * | 10/2008 | Park | G06T 7/536 | 348/143 |
| 2008/0263012 A1 * | 10/2008 | Jones | G09C 1/00 | |
| 2008/0294487 A1 * | 11/2008 | Nasser | G06Q 30/0203 | 705/7.32 |
| 2008/0303902 A1 * | 12/2008 | Romer | G07F 19/207 | 348/143 |
| 2008/0306756 A1 * | 12/2008 | Sorensen | G06Q 30/02 | 705/27.1 |
| 2008/0316327 A1 * | 12/2008 | Steinberg | G06T 3/4038 | 348/222.1 |
| 2009/0034797 A1 * | 2/2009 | Senior | G06K 9/00785 | 382/104 |
| 2009/0164284 A1 * | 6/2009 | Koiso | G06K 9/00771 | 705/7.29 |
| 2009/0192882 A1 * | 7/2009 | Narahashi | G06Q 30/02 | 705/7.29 |
| 2009/0195388 A1 * | 8/2009 | Ikumi | G06K 9/00335 | 340/572.1 |
| 2010/0117790 A1 * | 5/2010 | Bayne | G07C 9/28 | 340/5.21 |
| 2010/0277276 A1 * | 11/2010 | Bayne | G07C 9/28 | 340/5.21 |
| 2011/0282662 A1 * | 11/2011 | Aonuma | G10L 17/26 | 704/231 |
| 2013/0027561 A1 * | 1/2013 | Lee | G06K 9/00302 | 348/150 |
| 2013/0132241 A1 * | 5/2013 | Sorensen | G06Q 30/06 | 705/28 |
| 2013/0159081 A1 * | 6/2013 | Shastry | G06Q 20/20 | 705/14.23 |
| 2013/0159310 A1 * | 6/2013 | Birdwell | G06F 16/2453 | 707/737 |
| 2013/0223678 A1 * | 8/2013 | Brunetti | G06K 9/00778 | 382/103 |
| 2013/0226655 A1 * | 8/2013 | Shaw | G06F 30/20 | 705/7.29 |
| 2014/0236973 A1 * | 8/2014 | Tsefrikas | G06Q 10/0637 | 707/756 |
| 2014/0249934 A1 * | 9/2014 | Subramanian | G06Q 20/4016 | 705/14.72 |
| 2014/0267735 A1 * | 9/2014 | Carey | H04N 7/181 | 348/150 |
| 2014/0379296 A1 * | 12/2014 | Nathan | G06F 17/18 | 702/150 |
| 2015/0006243 A1 * | 1/2015 | Yuasa | G06Q 30/0201 | 705/7.29 |

(56) References Cited

U.S. PATENT DOCUMENTS

| | | | |
|---|---|---|---|
| 2015/0095107 A1* | 4/2015 | Matsumoto | G06K 9/00771 705/7.29 |
| 2015/0169954 A1* | 6/2015 | Schlattmann | G06K 9/00624 382/103 |
| 2015/0235161 A1* | 8/2015 | Azar | H04W 4/029 705/7.15 |
| 2015/0286638 A1* | 10/2015 | Li | G06F 16/50 382/190 |
| 2016/0005053 A1* | 1/2016 | Klima | G06Q 10/06 705/7.29 |
| 2016/0092821 A1* | 3/2016 | Ozaki | G06K 9/00335 705/7.42 |
| 2016/0283955 A1* | 9/2016 | Terrazas | G06Q 30/0202 |

\* cited by examiner

|   | OA | OB | OC | OD | OE | ON |
|---|---|---|---|---|---|---|
| A | P(I=A\| OI=A) | P(I=A\| OI=B) | P(I=A\| OI=C) | P(I=A\| OI=D) | P(I=A\| OI=E) | P(I=A\| OI=N) |
| B | P(I=B\| OI=A) | P(I=B\| OI=B) | P(I=B\| OI=C) | P(I=B\| OI=D) | P(I=B\| OI=E) | P(I=B\| OI=N) |
| C | P(I=C\| OI=A) | P(I=C\| OI=B) | P(I=C\| OI=C) | P(I=C\| OI=D) | P(I=C\| OI=E) | P(I=C\| OI=N) |
| D | P(I=D\| OI=A) | P(I=D\| OI=B) | P(I=D\| OI=C) | P(I=D\| OI=D) | P(I=D\| OI=E) | P(I=D\| OI=N) |
| E | P(I=E\| OI=A) | P(I=E\| OI=B) | P(I=E\| OI=C) | P(I=E\| OI=D) | P(I=E\| OI=E) | P(I=E\| OI=N) |
| N | P(I=N\| OI=A) | P(I=N\| OI=B) | P(I=N\| OI=C) | P(I=N\| OI=D) | P(I=N\| OI=E) | P(I=N\| OI=N) |

$$
\begin{array}{c}
\phantom{P0}\\
P0\\
P1\\
P2\\
P3
\end{array}
\left(
\begin{array}{ccccccccccc}
0 & 0 & 0 & 0 & -1 & -1 & -1 & -1 & -1 & -1 & -1\\
-1 & -1 & 0 & 0 & 0 & 0 & 0 & 0 & 0 & 0 & -1\\
-1 & 0 & 0 & 0 & 0 & 0 & 0 & 0 & 0 & -1 & -1\\
-1 & -1 & -1 & -1 & -1 & 0 & 0 & 0 & 0 & 0 & 0
\end{array}
\right)_{836}
\cdot
\begin{array}{cccc}
P0 & P1 & P2 & P3
\end{array}
\left(
\begin{array}{cccc}
1 & 0 & 0 & 0\\
1 & 0 & 0 & 0\\
0 & 1 & 0 & 0\\
1 & 0 & 0 & 0\\
0 & 0 & 1 & 0\\
0 & 0 & 1 & 0\\
0 & 1 & 0 & 0\\
0 & 0 & 0 & 1\\
0 & 0 & 1 & 0\\
0 & 1 & 0 & 0\\
0 & 0 & 0 & 1
\end{array}
\right)_{83}
$$

Fig. 18

$$\begin{pmatrix} ep0 \\ ep1 \\ ep2 \\ ep3 \\ ep4 \\ ep5 \\ ep6 \\ ep7 \\ ep8 \\ ep9 \\ ep10 \end{pmatrix}^T \bullet \begin{pmatrix} 1 & 0.9 & 0 & 0.7 & 1 & 0 & 0 & 0 & 0 & 0 & 0 \\ 0.9 & 1 & 0 & 0.8 & 0 & 0 & 0 & 0 & 0 & 0 & 0 \\ 0 & 0 & 1 & 0 & 0 & 0 & 0.6 & 0 & 0 & 0.7 & 0 \\ 0.7 & 0.8 & 0 & 1 & 0 & 0 & 0 & 0 & 0 & 0 & 0 \\ 0 & 0 & 0 & 0 & 1 & 0.3 & 0 & 0 & 0.8 & 0 & 0 \\ 0 & 0 & 0 & 0 & 0.3 & 1 & 0 & 0 & 0 & 0 & 0 \\ 0 & 0 & 0.6 & 0 & 0 & 0 & 1 & 0 & 0 & 0 & 0 \\ 0 & 0 & 0 & 0 & 0 & 0 & 0 & 1 & 0 & 0 & 0.6 \\ 0 & 0 & 0 & 0 & 0.8 & 0 & 0 & 0 & 1 & 0 & 0 \\ 0 & 0 & 0.7 & 0 & 0 & 0 & 0 & 0 & 0 & 1 & 0 \\ 0 & 0 & 0 & 0 & 0 & 0 & 0.6 & 0 & 0 & 0 & 1 \end{pmatrix} \bullet \begin{pmatrix} ep0 \\ ep1 \\ ep2 \\ ep3 \\ ep4 \\ ep5 \\ ep6 \\ ep7 \\ ep8 \\ ep9 \\ ep10 \end{pmatrix}$$

Fig. 19

METHOD AND SYSTEM FOR FINDING CORRESPONDENCE BETWEEN POINT-OF-SALE DATA AND CUSTOMER BEHAVIOR DATA

CROSS-REFERENCE TO RELATED APPLICATIONS

Substitute Application for patent application Ser. No. 12/313,635

FEDERALLY SPONSORED RESEARCH

Not Applicable

SEQUENCE LISTING OR PROGRAM

Not Applicable

FIELD OF THE INVENTION

The present invention is a method and system to provide correspondences between the point-of-sale data registered at the store checkout and the observed shopper behavior data.

BACKGROUND OF THE INVENTION

The current consumer-oriented retail industry increasingly depends on the information about consumers' needs and their behavior in the retail environment—what they want to buy, in what way they are satisfied, and how they make purchase decisions. There seems to be highly-complex interplay of various factors in the shoppers' perceptions of products and their decision making processes. While it is unfeasible to fully understand consumer behavior, certain consumer behavior does reveal their mental process toward purchase decisions.

The widespread use of video cameras in stores and advancements of video analysis technology have made it possible to extract shopper behavioral data from in-store videos. Shoppers can be tracked within each field of view of cameras, and also across multiple camera views. Utilizing video processing and artificial intelligence technology, customer interaction with products can be analyzed and recognized to some extent. This kind of analysis provides a rich source of information from which many current state-of-the-art statistical analyses and data mining techniques can be used to extract useful data for marketers or retailers.

On the other hand, retail stores keep vast amounts of point-of-sale data—the lists of purchased products along with customer IDs. While the POS data itself provides valuable information such as customer loyalty data, cross-shopping data, etc., it fails to provide any additional aspects of shopper behavior, for example, how the shoppers interact with products and choose to purchase products. The addition of shopper behavior data matched to the POS data provides a missing piece in the puzzle of understanding customer behavior in a retail space. However, because it is not cost-effective or sometimes not physically feasible to cover the whole store floor, in-store videos typically do not provide matches between the tracked customers and the checking out customers. Under this scenario, a systematic strategy is necessary to make correspondences based on available data.

The present invention provides a framework and means to find correspondences between the POS data and the customer behavior data by identifying which person at the checkout caused which purchase events and behavioral cues detected from point-of-purchase videos. In a typical scenario, the POS (point-of-sale) data is available—the identity of each of the checking out shoppers along with the list of the items purchased. The behavior data of shoppers is estimated from an automatic analysis of videos collected from store aisles or end caps. The behavior data is typically generated in the form of purchase events with estimated purchase items, and the track of the shopper in the area covered by the view of the videos. Under this scenario, the complete shopping track of the customer is not available, due to the cost or physical constraints of camera placements. Consequently, the correspondence between the customer identity from the POS data and the customer identity of the shopper in the behavior data is not given. Therefore, the present invention finds the correspondences between the checkout data (POS) and the shopping behavior data from videos. More specifically, given the POS data—the shopper, the time of the checkout, and the list of the purchase items—the corresponding purchase events observed from the point-of-purchase videos need to be identified.

There have been prior attempts for analyzing customer transaction data to further extract useful information. One method generates an identification code for each customer based on the identification provided by a shopper at checkout. The method associates all products purchased by that shopper to that identification code, and that purchase history is stored in a centralized database. Based on the purchase history, the method provides for a means to target sales promotions to those shoppers.

One method and system gathers and analyzes customer and purchasing information and transaction information corresponding to large numbers of consumers and consumer products. Consumers are grouped into clusters based on demographic information, and products are grouped into generic clusters. Consumer retail transactions are analyzed in terms of product and/or consumer clusters to determine relationships between the consumers and the products. Product, consumer, and transactional data are maintained in a relational database. A retailer queries the database using selected criteria, accumulates data from the database in response to that query, and makes prudent business and marketing decisions based on that response.

Another method discloses a customer behavior based on the time when those behaviors occur. This method collects information about customer transactions and interactions over time, classifies customers into one or more clusters based on their time-based interactions and transactions, or both. The customer interactions with products consist of web-browsing activity, response to call center surveys, and purchase history in store. The method temporally tags customer transactions and interactions, analyzes the tagged information to create temporal profiles, creates advertising campaigns aimed at the temporal profiles, triggers an advertising campaign, and analyzes the effectiveness of the advertising campaign.

One system anticipates consumer behavior and determines transaction incentives for influencing consumer behavior. The system comprises a computer system and associated date for determining cross time correlations between transaction behavior, for applying the fiction derived from the correlations to consumer records to predict future consumer behavior, and for deciding on transaction incentives to offer the consumers based upon their predicted behavior.

The above methods and systems attempt to deliver insight into consumer behavior that impacts shopper purchasing in retail environments. However, these methods use only the POS data to derive insight into customer purchase behavior. By relying on POS data, these methods fail to capture customer behavior at a key juncture in shopper decision making, the point of purchase where customers place the item in their shopping basket. The customer weighs multiple factors including price, nutrition content, and brand at shelf before placing the item in his/her basket. This kind of information is not available through the methods described above.

There have been prior attempts for tracking customers and measuring customer interactions with products for the purpose of understanding their behaviors.

One method gathers data on the at-shelf behavior of shoppers in a retail market. A scanner attached to a shopping basket detects the removal of an item from a shelf, the identity of the removed item, the placement of an item into a shopping basket, which may be the identical item removed from the shelf, and the identity of the inserted item. Repeated detection of this type of data for numerous items, and numerous shoppers, allows one to draw inferences about the shoppers, such as how often comparison shopping occurs. This type of detection measures specific responses to the actions of the shoppers.

Another method analyzes shopper behavior of a shopper within a shopping environment. The method determines product locations in a store, tracks the path of a shopper through the shopping environment via a wireless tracking system, and calculates a product-shopper proximity measure based at least in part on a physical distance of a shopper traveling along the shopping path from the position of the product.

A monitoring system and method uses a shopper's location information and behavior prior to approaching the checkout counter to detect fraud. A tracking mechanism tracks a shopper and merchandise as the shopper is shopping and generates a list of currently acquired items. At the point-of-sale, the list of currently acquired items is compared to the list of purchase items and any discrepancies are provided. Another method determines whether a product is removed from a display. The method utilizes RFID tags installed in products and RFID sensors installed in a store.

In the above systems and methods, special devices installed on shopping baskets/carts and/or attached to products are required to measure the shopping and purchase behavior of customers. Such infrastructure is a high-cost means for tracking customer behavior and fails to capture the detailed information possible through video.

There have been prior attempts for analyzing customer behavior in the retail environment based on video images.

One method collects video surveillance data received from multiple unaffiliated locations at which various items are offered for sale. Based on the content of the video surveillance data, consumer preference behavior is characterized with respect to at least some of the items. The method can also collect POS data among other datasets to provide context to retailers. The data is consolidated and can be made available for further analysis. However, while this method does collect POS data, it does not provide the means for associating the POS data with shopper behavior to provide further insight into the impact of shopper behavior on purchase decisions.

Another method describes a video monitoring process which includes a video analytics engine to process video obtained by a video camera and generates video primitives regarding the video. A user interface is used to define at least one activity of interest regarding an area being viewed, each activity of interest identifying at least one of a rule or a query regarding the area being viewed. An activity inference engine processes the generated video primitives based on each defined activity of interest to determine if an activity of interest occurred in the video. While this method defines shopper activities of interest to the retailer and other stakeholders, it fails to connect the shopper behavior to a larger context of sales and business performance.

There have been prior attempts for making correspondences between data based on the measured attributes, using a statistical analysis.

One method associates customer behavior with purchases. Customer behavior is measured through collection of flow line data. Flow line data is collected by deploying video sensors, tracking customer paths from entry to exit and collecting the customer behavior and timestamps during the customer path. A specific identification is associated with flow line data. Times of payment are also estimated and then associated with the flow line data belonging to a specific ID with closest timestamp. Another method associates the consumer behavior within a particular sub-area to the transaction data using time-stamped flow line data captured by video. Another method associates the trajectory of shoppers with corresponding transaction data. The method uses known video tracking methods to generate trajectories of persons within areas of interest. The method associates video of transactions with customer trajectories which are not necessarily complete trajectories throughout the store.

These methods require use of an operator to complete essential functions in the method including estimating time of payment, following the flow line data to monitor customer behavior, determining the terminal number at time of transaction, etc. The requirement of manual input makes the methods difficult to carry out in an actual retail setting with many customers simultaneously checking.

One method discloses an optimization method for product placement within a retail store. The method uses position identifying systems to track where products are stocked within the store and paths of customers. Customers can be identified using financial transaction or other data. Products are chosen for purchase by customers and identified in their basket using perhaps GPS receivers, and the locations of the chosen products within the retail space are associated with the customer paths. The method further uses data mining to analyze the spatial relationships between customers and products. Because the method does not use video for customer and product tracking, the method cannot detect granular behaviors which positioning information systems may fail to detect.

The present invention addresses key gaps in the prior art with respect association between retail POS data and shopper behavior data. While there have been prior attempts to extract useful marketing information from POS data, the present invention provides a unique feature in that it combines the POS data and shopper behavior data. There have also been prior attempts to measure in-store shopper behaviors, but they depend on special communication devices, such as RFID tags and sensors, to track customers throughout the store and to detect product purchases from store shelves. The present invention depends instead on behavior data measured from point-of-purchase videos.

SUMMARY

The present invention is a method and system to provide correspondences between point-of-sale data registered at the store checkout and shopper behavior data observed at the point-of-purchase through video analysis. These correspondences are then presented to the retailer and other stakeholders in the form of a display in order to facilitate deeper analysis into shopper and product and retail planning.

It is one of the objectives of the first step of the processing to construct a binary table of shoppers versus purchase items from the POS data. In one of the exemplary embodiments, shopper likelihood is derived from the table.

It is one of the objectives of the second step of the processing to construct a binary table of events versus estimated purchase items from the automatically generated purchase event data. In one of the exemplary embodiments, event likelihood is derived from the table.

It is one of the objectives of the third step of the processing to compute the item likelihood—the conditional probability distributions of a true purchase item ID given an item ID estimated from videos, based on the list of ground truth purchase item IDs and estimated item IDs.

It is one of the objectives of the fourth step of the processing to compute the event association table, based on the shoppers' tracks. In one of the exemplary embodiments, the event pair association prior (the probability distributions of two events belonging to the same shopper) is computed.

It is one of the objectives of the fifth step of the processing to set up a correspondence equation based on the constraints.

In one of the exemplary embodiments, the algebraic relation of the POS data and shopper behavior data correspondence with the item-shopper matrix and the item-event matrix constitutes the main optimization term. Additional terms representing the event time constraint and the event pair constraint are added to the equation.

In one of the exemplary embodiments, the correspondence problem has the form of computing the posterior probability distribution of the shopper ID given the observed item ID from events data, expressed in terms of the shopper likelihood, item likelihood, event likelihood, and event pair association prior.

It is one of the objectives of the sixth step of the processing to find the correspondence by solving the correspondence equation.

DRAWINGS—FIGURES

FIG. 15 shows an exemplary embodiment of the item likelihood.

FIG. 18 shows an exemplary embodiment of the event time constraint matrix and its application for event time constraint.

FIG. 19 shows an exemplary embodiment of the event pair constraint implemented by the event association matrix.

DETAILED DESCRIPTION OF THE INVENTION

Figure 1:
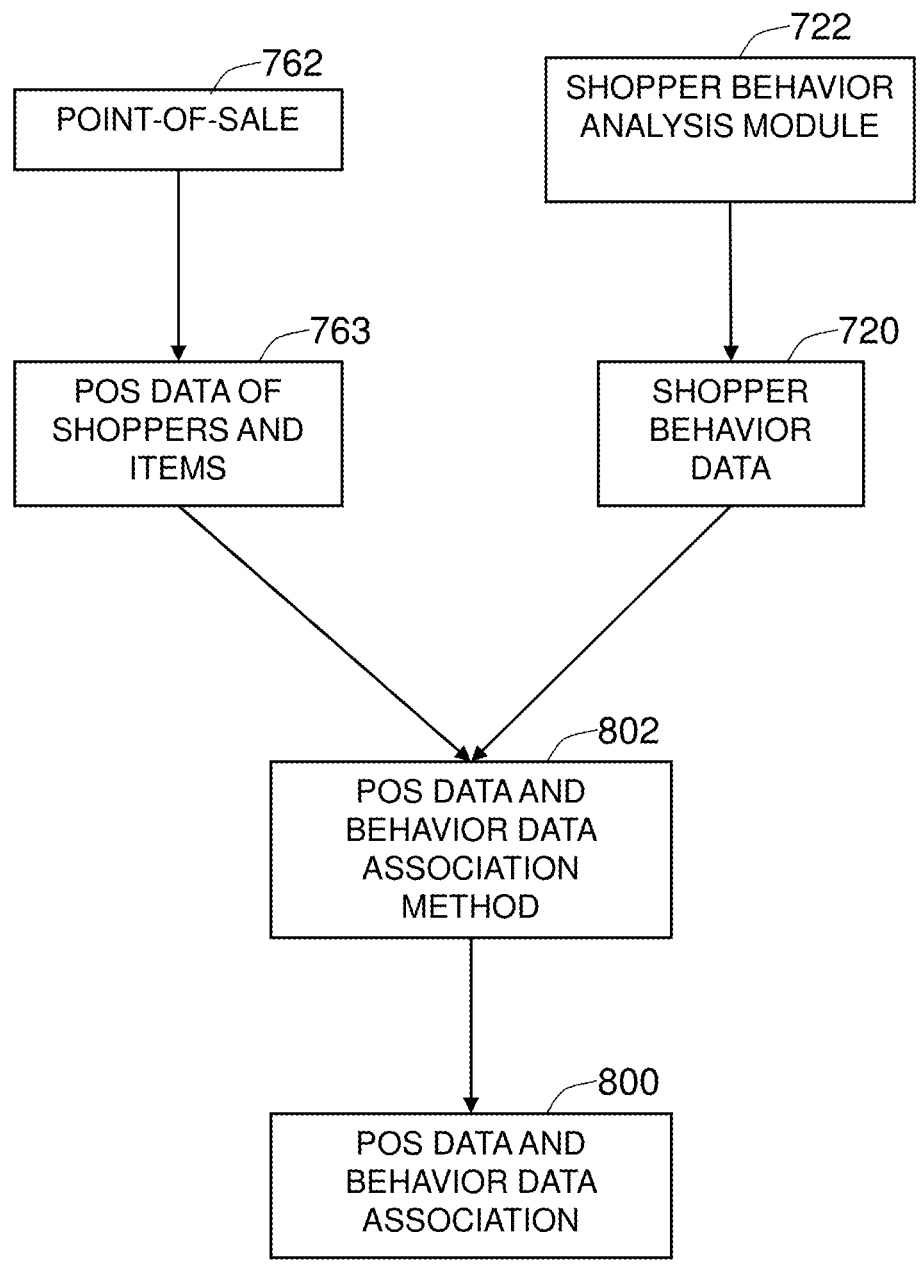
FIG. 1 is an overall scheme of the system in a preferred embodiment of the invention.

FIG. 1 is an overall scheme of the system in a preferred embodiment of the invention. The POS data of shoppers and items 763 and the shopper behavior data 720 comprise inputs to the POS data and behavior data association method 802. The POS data of shoppers and items 763—generated at the point-of-sale 762—consist of the list of checkout events with shoppers 701, their purchase items 741, and checkout timestamps 786. The shopper behavior data 720—generated from the shopper behavior analysis module 722—consists of a list of purchase events 771 with purchase event timestamps 776 and the observed purchase items 751. The POS data and behavior data association method 802 adopts a series of processing to determine the POS data and behavior data association 800. The present invention is a method and apparatus for making the finding the correspondences between the POS data of shoppers and items 763 and the shopper behavior data 720.

Figure 2:
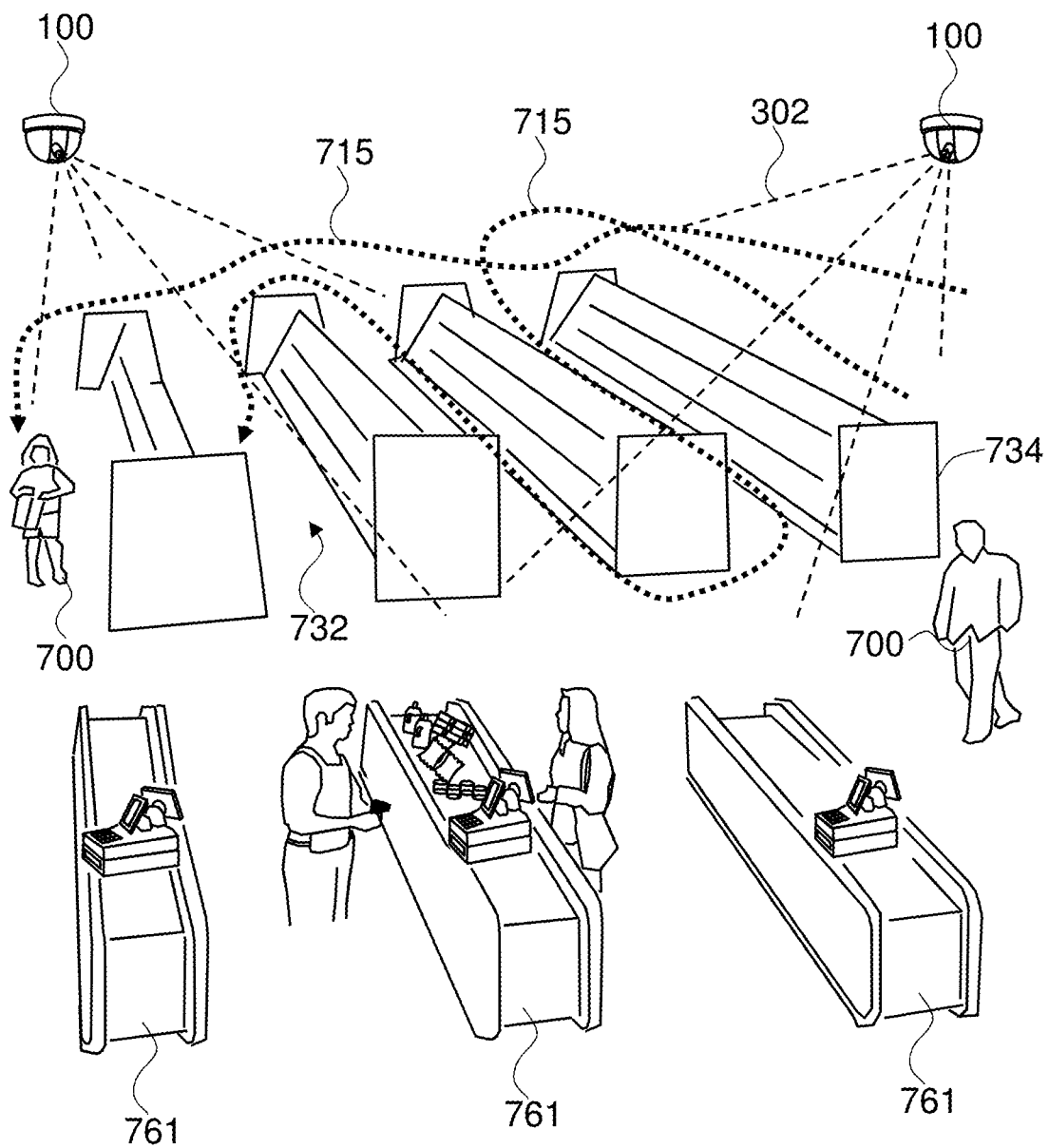
FIG. 2 shows a view of the system of the invention in an operational environment in an exemplary embodiment.

FIG. 2 shows a view of the system of the invention in an operational environment in an exemplary embodiment. Each shopper 700 browses through the store aisle 732 choosing items to purchase. The means for capturing images 100 capture the shoppers within each field of view 302, and possibly across different fields of view. The shopper behavior analysis module 722 generates purchase events 771 whenever it determines that a shopper picks up an item from a shelf 734. The purchase events 771 include both the purchase event timestamps 776 and the observed purchase items 751. The shopper behavior analysis module 722 can also make correspondence between purchase events based on a shopper track 715 between events—the purchase events 771 that are generated by the same shopper 700. Once the shopper 700 finishes shopping and decides to pay for the items, he or she goes to the checkout counter 761. The POS data is generated per each shopper 700, and includes both the identity of the shopper and a list of the checkout items. The shopper ID can be a true person identity gathered from membership (such as a discount membership) or credit card transactions, in which case the customer loyalty can also be part of the analysis. It can be just a temporary ID (e.g., shopper number 34) to distinguish one shopper from another.

Figure 3:
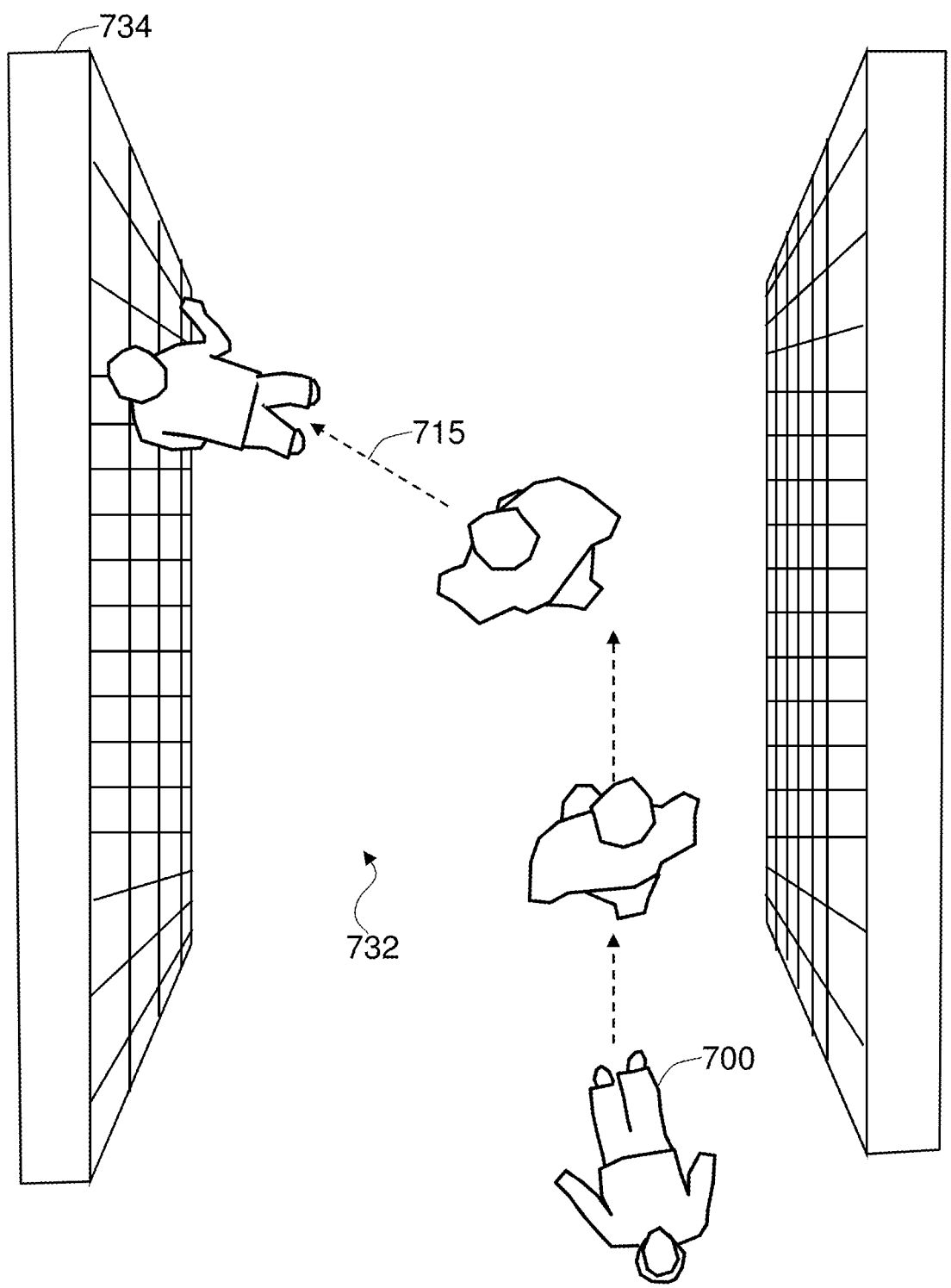
FIG. 3 shows an exemplary embodiment of shopper behavior from point-of-purchase video.

FIG. 3 shows an exemplary embodiment of shopper behavior from point-of-purchase video. The shopper 700 browses through the store aisle 732 and approaches a shelf 734 whenever he or she finds an item of interest. When the shopper track 715 slows down and moves toward the shelf 734, the behavior triggers the shopper behavior analysis module 722 to further pay attention to the interaction of the shopper 700 with the items.

Figure 4:
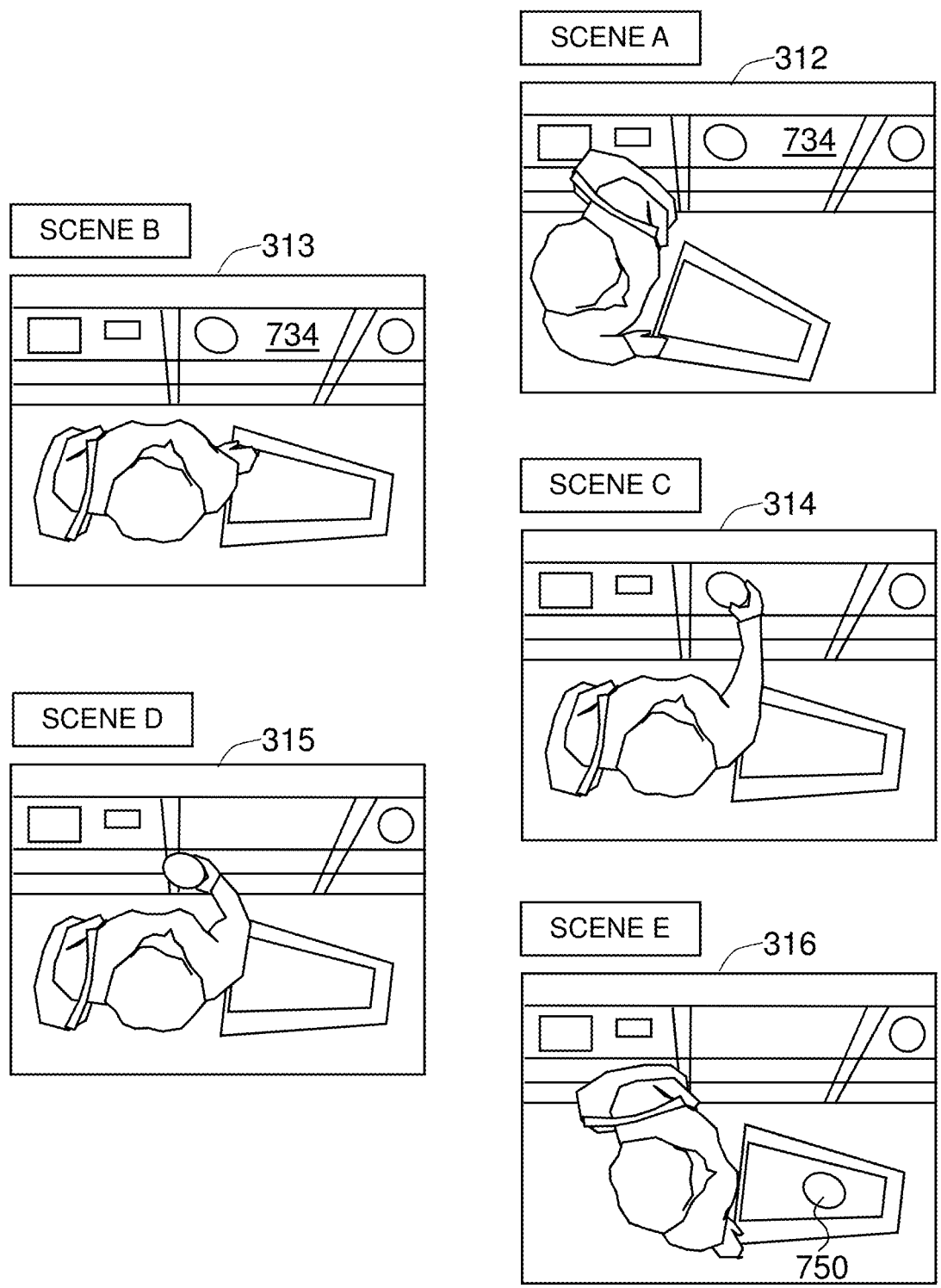
FIG. 4 shows a shopper behavior analysis module in an exemplary embodiment of the present invention.

FIG. 4 shows the shopper behavior analysis module 722 in an exemplary embodiment of the present invention. In scene A 312, a shopper 700 is close enough to the shelf 734, so that proximity alone can identify the incident as a shopper engagement with items. In scene B 313, both the proximity information and the body orientation information can correctly detect a shopper engagement with products on the shelf 734. In scene C 314, an occurrence of the shopper reaching out her arm toward the shelf can be detected from the foreground object analysis that is focused on the space between the shopper 700 and the shelf 734; in effect, the shopper interaction is detected. In scene D 315, an occurrence of a shopper interaction with a product—more specifically, an instance of picking up the item—is detected based on the foreground object analysis that is focused on the shelf space close to the shopper. In scene E 316, an occurrence of product purchase is detected based on the foreground object analysis focused on both the shelf close to the shopper and the shopping cart 765 that belongs to the shopper. The observed purchase item 750 is recognized from a product layout of the store. At this stage, the algorithm generates a purchase event 770, and records the purchase event timestamp 776 and the observed purchase item 750.

Figure 5:
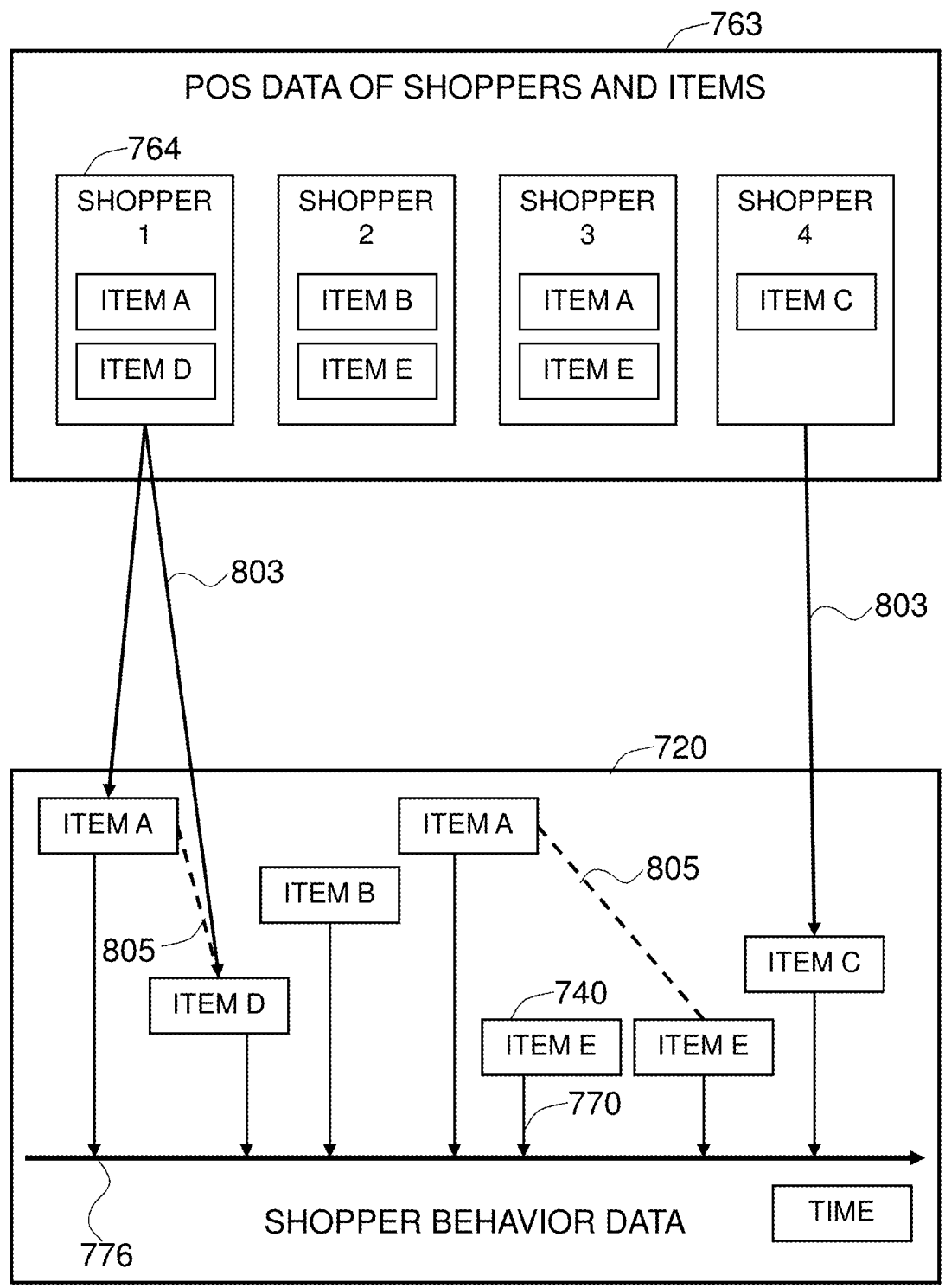
FIG. 5 shows an exemplary embodiment of the correspondence between the POS data of shoppers and items and the shopper behavior data.

FIG. 5 shows an exemplary embodiment of the correspondence between the POS data of shoppers and items 763 and the shopper behavior data 720. In this embodiment, the POS data of shoppers and items 763 consists of basket data 764 for four shoppers, from shopper 1 through shopper 4, along with the lists of items they purchased from a pool of five items labeled as item A through item E. The shopper behavior data 720 consists of a purchase event 770 characterized by the purchase event timestamp 776 and the observed purchase item 750. The shopper behavior analysis module 722 may provide association 805 between events, based on successful tracking of the shopper between these events. The POS data and behavior data association method 802 determines the correspondence 803.

Figure 6:
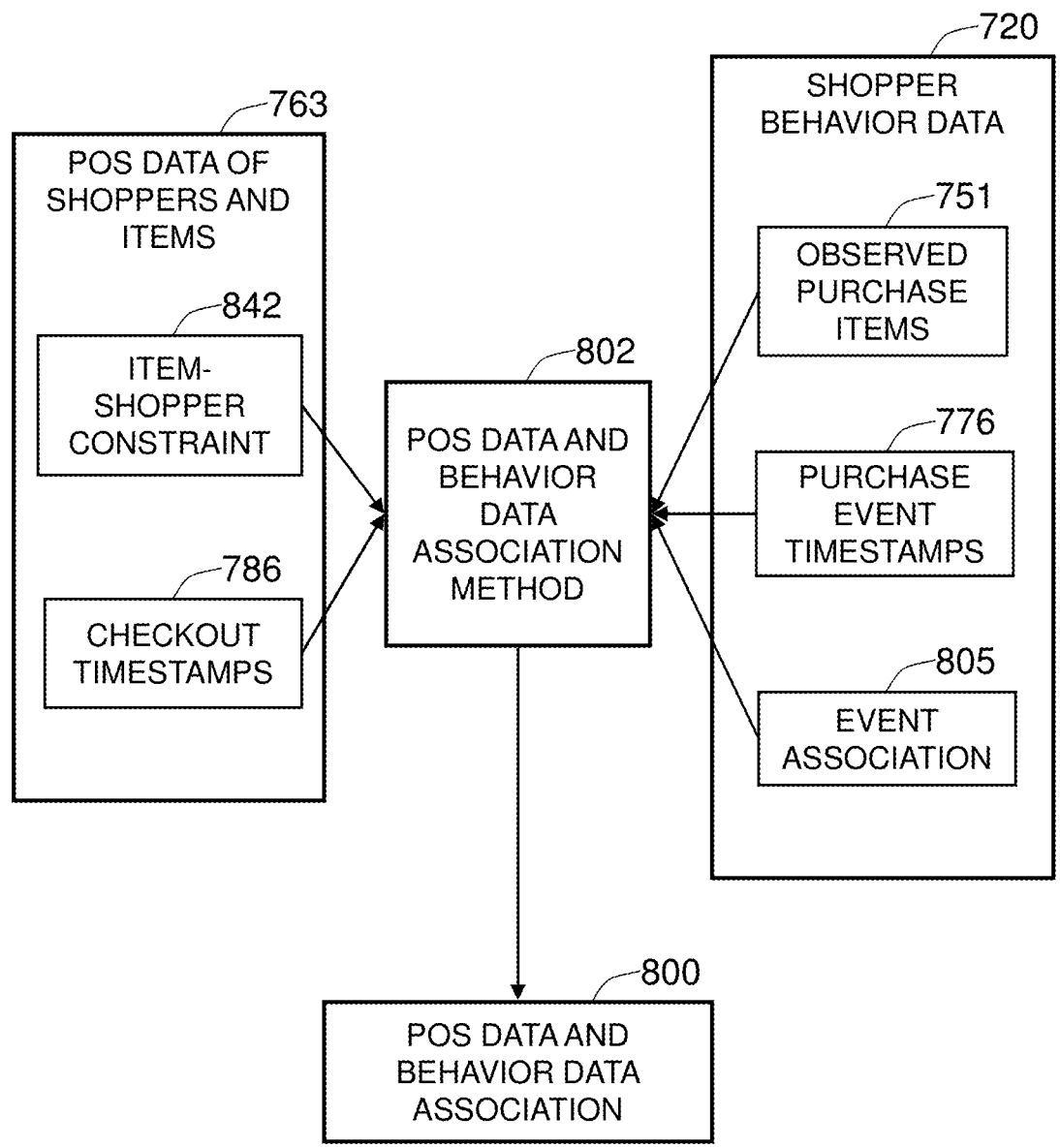
FIG. 6 shows a summary of the constraints employed by the POS data and behavior data association method.

FIG. 6 shows a summary of the constraints employed by the POS data and behavior data association method 802. The POS data of shoppers and items 763 provides the item-shopper constraint 842 as well as the checkout timestamps 786. The item-shopper constraint 842 limits the candidate matches between the shoppers at the checkout and the items from purchase events at the point-of-purchase, because a shopper can only be responsible for the purchase of items that are in the checkout basket. The checkout timestamps 786 enforce natural constraints that a purchase event should occur within some reasonable time period from the corresponding checkout event 780. The shopper behavior data 720 contains the observed purchase items 751, purchase event timestamps 776, and event association 805. The observed purchase items 751 are the main source of information when trying to match the given purchase event 770 to POS data. In a simplest scenario where the POS data reveals that a specific product was checked out only once during some window of time, then the event recognized as the purchase of the same item should be the only match. However, due to frequent purchases of some popular items, the matching process typically needs to handle much higher ambiguity. The purchase event timestamp 776 is used to constrain the purchase event times from the checkout event timestamps 786, as described previously. The shopper tracks 716 provide extra information about whether some number of purchase events belongs to the same shopper; this information is called event association 805.

These constraints are systematically applied in the POS data and behavior data association method 802 to find the correspondence 803.

Figure 7:
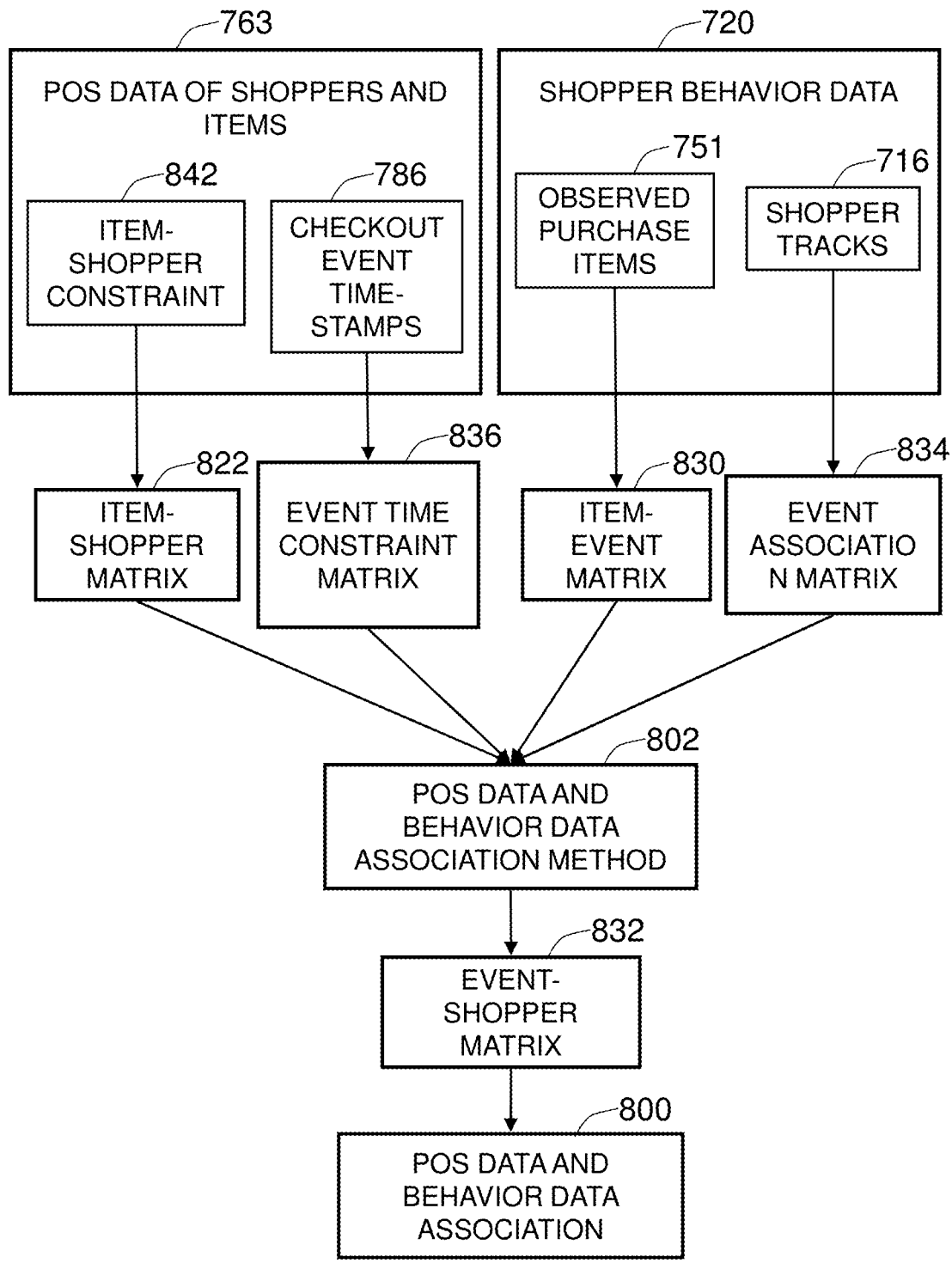
FIG. 7 shows an exemplary embodiment of the way the constraints and a solution to the problem are converted into mathematical data forms.

FIG. 7 shows an exemplary embodiment of the way the constraints and a solution to the problem are converted into mathematical data forms so that the problem can be put into an algebraic framework. First, the item-shopper constraint 842 can be converted to an item-shopper matrix 822, where an instance of a shopper purchasing an item is represented as a binary flag (1 for a presence of purchase, 0 for an absence of purchase) in a table of shoppers versus items. The item-shopper matrix can be represented as IP={$ip_{ij}$}. The event time constraint—the purchase event of a shopper should precede the checkout event and should happened within a reasonable time window from the checkout event—is mandated by the checkout event timestamp 786. The constraint can be implemented by the event time constraint matrix 836. The event time constraint matrix 836 can also reflect the information regarding the number of checkout items, so that the event time constraint can adopt a larger time window for purchase events, for a checkout event involving many items. The list of observed purchase items 751 for each event are converted to an item-event matrix 830, where an instance of an observed purchase item 750 is represented by a binary flag in a table of items versus events. The item-event matrix 830 is represented by the equation IE={$ie_{ij}$}. Association between events based on shopper tracks 716 are converted to a binary matrix of events versus events, called an event association matrix 834; each entry in the matrix quantifies the degree of association between two events (whether they belong to the same person). The degree of association comes from the shopper tracks generated by the shopper behavior analysis module 722.

Based on these matrices, the POS data and behavior data association method 802 estimates the event-shopper matrix 832; the matrix encodes the correspondence between the shoppers and the events, which is the same as the POS data and behavior data association 800. The event-shopper matrix can be represented as EP={$ep_{ij}$}.

Figure 8:
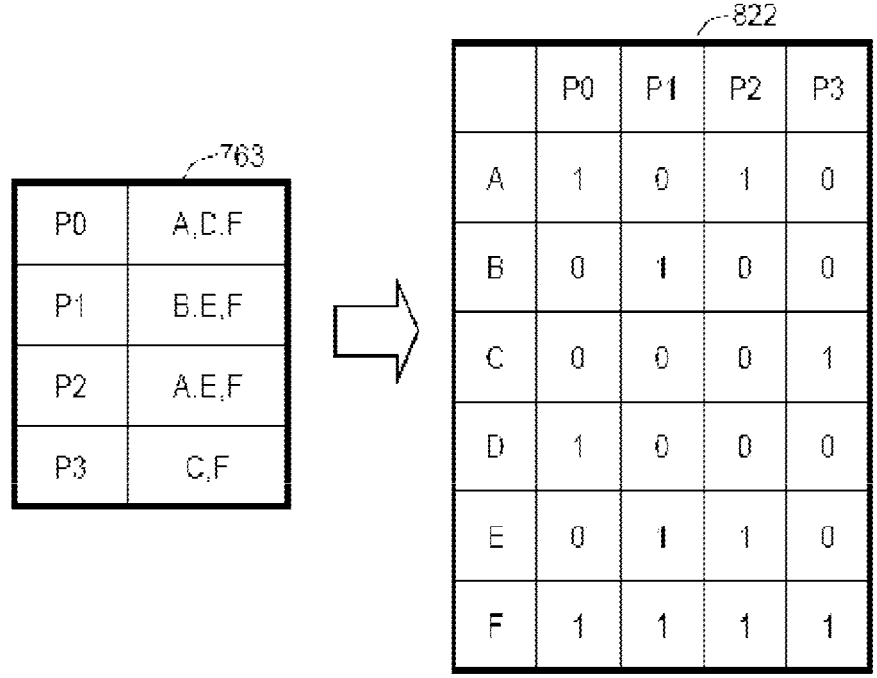
FIG. 8 shows an exemplary embodiment of the item-shopper matrix construction.

FIG. 8 shows an exemplary embodiment of the item-shopper matrix 822 construction. The POS data of shoppers and items 763 at the checkout consists of the list of shoppers 701 along with their purchase items 741. The letters 'A', 'B', 'C', 'D', and 'E' denote the true purchase item IDs. The item ID 'F' represents the checkout itself, and is introduced to the framework to handle the checkout timestamps 786 and the purchase event timestamps 776 in a consistent manner. The POS data is converted into a binary table of the shoppers versus items, called an item-shopper matrix 822. For example, the fact that the person P0 purchased the item A is marked by the '1' in the first row and first column of the table.

Figure 9:
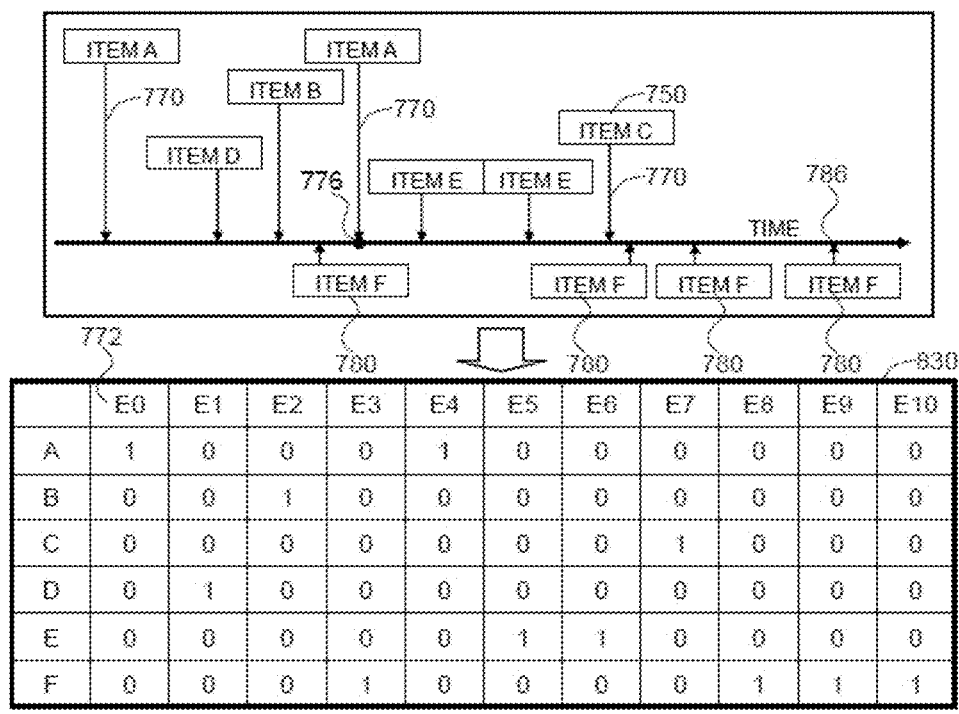
FIG. 9 shows an exemplary embodiment of the item-event matrix construction.

FIG. 9 shows an exemplary embodiment of the item-event matrix 830 construction. The shopper behavior analysis module 722 generate each purchase event 770 consisting of the observed purchase item 750, event IDs 772, and the corresponding purchase event timestamps 776. The checkout events 781 are marked by the item ID 'F'. The table summarizes the data as a binary table. For example, the first purchase event (E0) involving the item A is denoted as the flag '1' at the first row and the first column of the table. The entry of '1' at the event ID E3 and the item ID 'F' represent the first checkout event 780.

Figure 10:
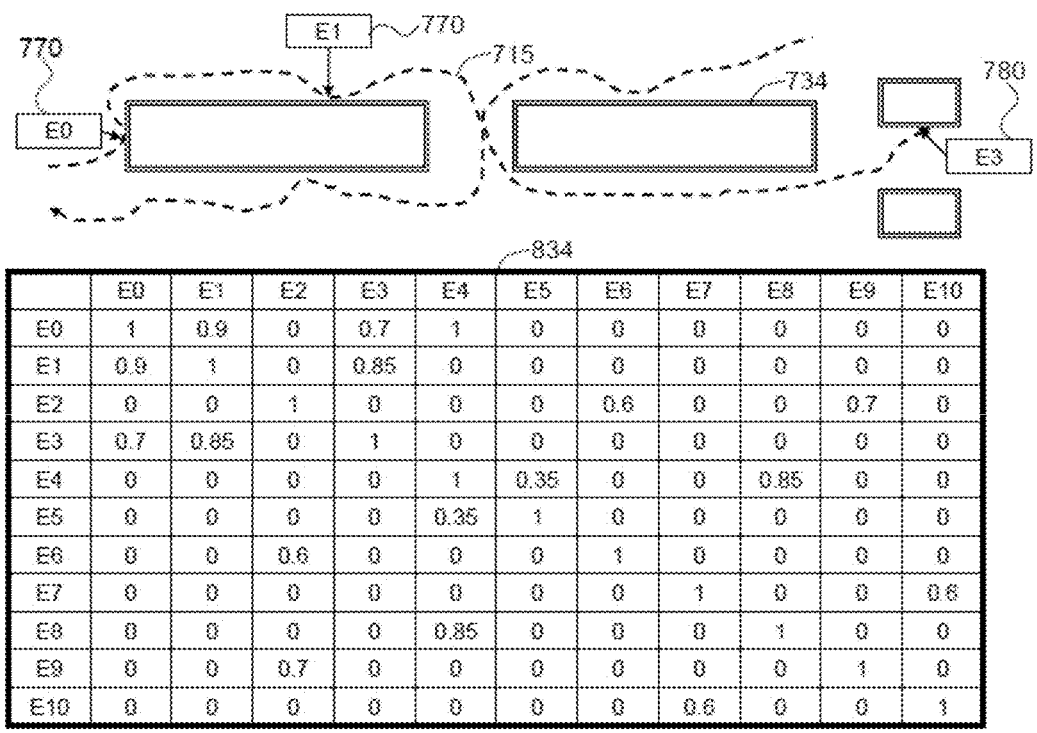
FIG. 10 shows an exemplary embodiment of the event association matrix construction.

FIG. 10 shows an exemplary embodiment of the event association matrix 834 construction. In this step, the constraints from shopper tracks 716 are converted to a matrix of association among events. Each entry in the matrix quantifies the degree of association between two events—whether these events were generated by the same person. The shopper behavior analysis module 722 detects and tracks shoppers across the store floor. In this embodiment, each purchase event 770 is detected based on the tracks and observed behavioral cues of the shoppers. Therefore, whenever two events are detected from a single continuous shopper track 715, it means that the two events belong to the same person. For example, when two events E0 and E1 are determined to belong to the same person with high confidence, the (E0, E1)-entry of the table should be 1. In an exemplary embodiment where the shopper tracks 716 are highly reliable, the event association can be strictly binary.

In another exemplary embodiment, the certainty (or probability) of two events belonging to the same track can be used to construct the table. In the figure, the shopper behavior analysis module 722 recognized events E0 and E1 along the same shopper's track with certainty of 0.9; the (E0, E1) or (E1, E0)-entry of the matrix is 0.9. In this embodiment, the associations between purchase events 771 and checkout events 781 can also be naturally included. Given a purchase event 770 and a checkout event 780, the probability of the two events belonging to the same person can be estimated based on the presence of the observed purchase item 750 in the basket (at the checkout) and the time difference between the two events.

Figure 11:
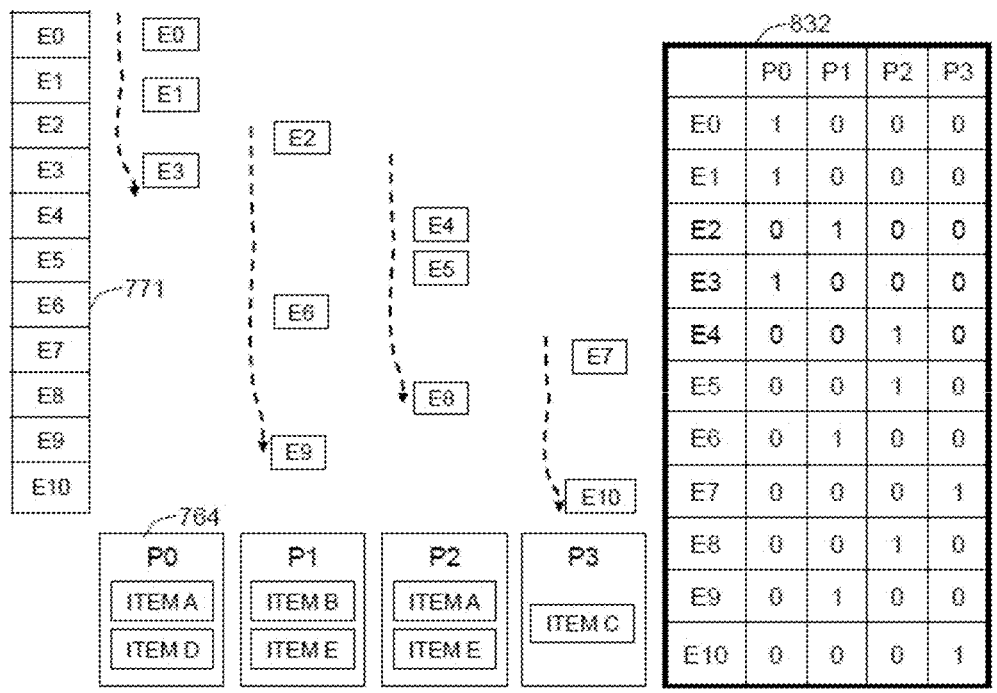
FIG. 11 shows an exemplary embodiment of the event-shopper matrix, constructed from a groundtruth shopper-event association.

FIG. 11 shows an exemplary embodiment of the event-shopper matrix 832, constructed from a groundtruth event-shopper association. The matrix quantifies the final association between the POS data of shoppers and items 763 and the shopper behavior data 720. The tracks on the left represent the purchase events 771 generated by the individual shoppers 701. Each box on the bottom of each track represents the shopping basket data 764 of the shopper 700 who generated the track. In the event-shopper matrix 832, the purchase events 771 are ordered according to time from top bottom, matching with the entry '1' in each row representing a shopper.

The event-shopper matrix 832 is the target quantity that the POS data and shopper behavior data association method 802 aims to estimate.

Figure 12:
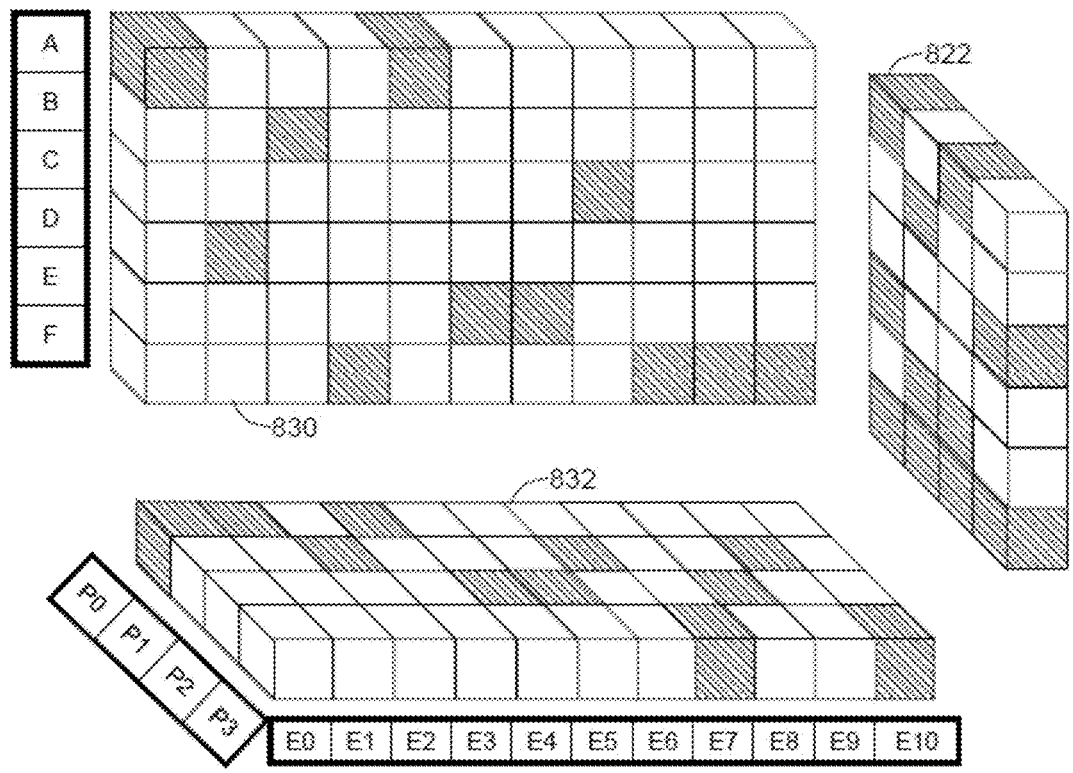
FIG. 12 shows the algebraic relation among item-shopper matrix, item-event matrix, and event-shopper matrix.

FIG. 12 shows the algebraic relation among the item-shopper matrix 822, the item-event matrix 830, and the event-shopper matrix 832. Due to the way that each of the matrices is constructed, there is a simple algebraic relation among the matrices. In the figure, a matrix is illustrated as blocks where (row, column) the positions of the individual blocks correspond to the (row, column) positions in the matrix, and the color of the block corresponds to the binary element of the matrix; white is 0 and gray is 1.

In the item-event matrix 830 (top), each column represents an event and the position of the unique gray block represents the purchase item 740 for that event. In the event-shopper matrix 832 (bottom), each column again represents an event and each row represents a shopper. The row position of the gray block in each column represents the shopper 700 who generated the purchase event 770. Because each column in these two matrices has a unique non-zero (gray) element, the multiplication of these two matrices amounts to finding the match between the shoppers and the items. That is, each element in the product matrix is the scalar product between the rows of the two matrices. For example, (i, j) element of the product matrix is the scalar product of the i-th row of the item-event matrix 830 and the j-th row of the event-shopper matrix 832. The scalar product generates a non-zero value only when the non-zero elements of the rows from the matrices come from the same column position. The product matrix is, in fact, exactly the same as the item-shopper matrix 822, whose elements represent the items-shoppers match.

This simple algebraic relation provides the basis for solving the correspondence problem.

Figure 13:
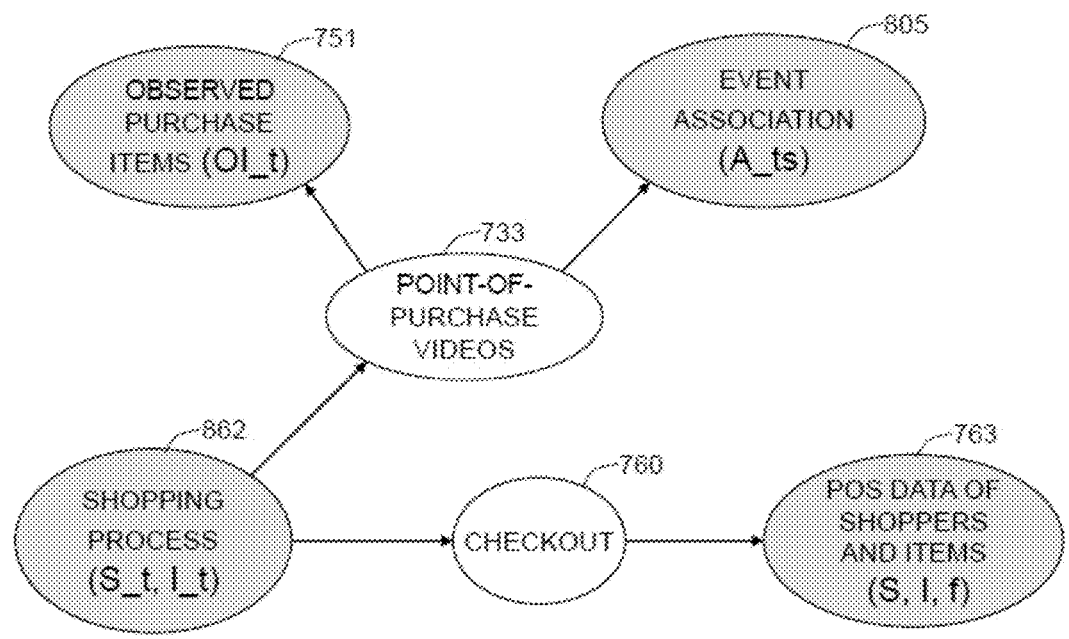
FIG. 13 shows an exemplary embodiment of the Bayesian generative model of the given correspondence problem.

FIG. 13 shows an exemplary embodiment of the Bayesian generative model 861 of the given correspondence problem. The model comprises a shopping process 862, POS data of shoppers and items 763, observed purchase items 751, and event association 805. The model starts with a generative model of the shopping process 862, consisting of the shopper $S\_t$ and the purchase item $I\_t$. The process $\{(S\_1, I\_t), (S\_2, I\_2), \ldots, (S\_T, I\_T)\}$ is a sequence of events where a shopper $S\_t$ picks up an item $I\_t$, at time instances $\{1, 2, \ldots, t, \ldots, T\}$. The shopping process 862 is not directly observable. It is most directly observed at the checkout 760 in the form of POS data of shoppers and items 763. Each shopping basket at the checkout 760 consists of the shoppers S, the checkout items I, and the checkout time f. The shopping process is also observable through point-of-purchase videos 733, in the form of purchase events 771. Each purchase event 770 has the observed purchase item 750 $OI\_t$, but with an unknown shopper. The shopper behavior analysis module 722 also provides event association 805 $A\_(t,\$)$, which represents whether the event at time t and the event at time s have been generated from the same shopper.

Figure 14:
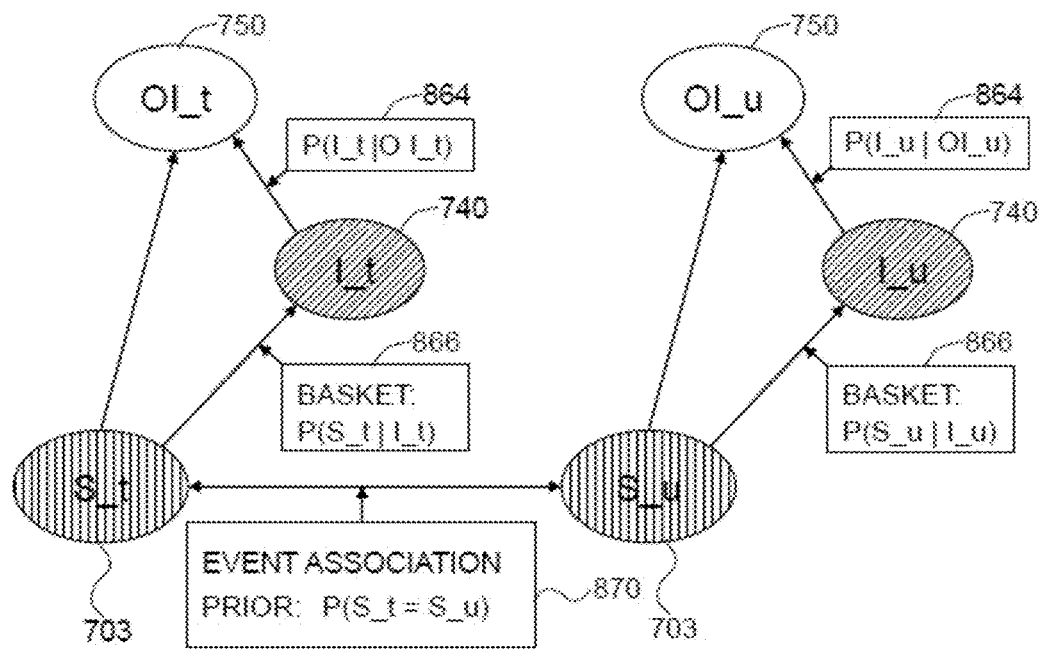
FIG. 14 shows an exemplary embodiment of the Bayesian model of the correspondence problem.

FIG. 14 shows an exemplary embodiment of the Bayesian model of the correspondence problem. This illustrates the relation between key variables, defined in FIG. 13, through probability densities. A shopper with shopper ID 703 $S\_t$ at time t makes a purchase of a (true) purchase item 740 $I\_t$; the corresponding shopper likelihood 866 $P(S\_t|I\_t)$ computed from the basket constrains the two quantities. The uncertainty of the observed purchase item 750 $IO\_t$ given the purchase item 740 $I\_t$ is represented through the item likelihood 864 $P(I\_t|OI\_0)$, which can be estimated from prior observations. The probabilistic structure of the purchase event at time u can be built in the same manner. Because each purchase event can be generated by the same shopper, the possible correlation between these two models is quantified by the event association prior 870 $P(S\_t=S\_u)$.

FIG. 15 shows an exemplary embodiment of the item likelihood 864. The symbols A, B, C, D, and E denote the purchase items 741. N denotes the null-event. The symbols OA, Oft OC, OD, OE, ON denote the observed purchase items 751. Values in each cell represent the corresponding conditional density. For example, the B-OC element is the probability that a purchase of OC is observed when the true item is B. The A-ON element is the probability that the true purchase of item A is not detected as a purchase event. Likewise, the N-OD element is the probability that the shopper behavior analysis system generates a false event that the item D has been purchased when there was no real purchase. The item likelihood 864 can be easily constructed from repeated observation of purchase events (observed purchase items 751) and comparison to true events (true purchase items 741).

Figure 16:
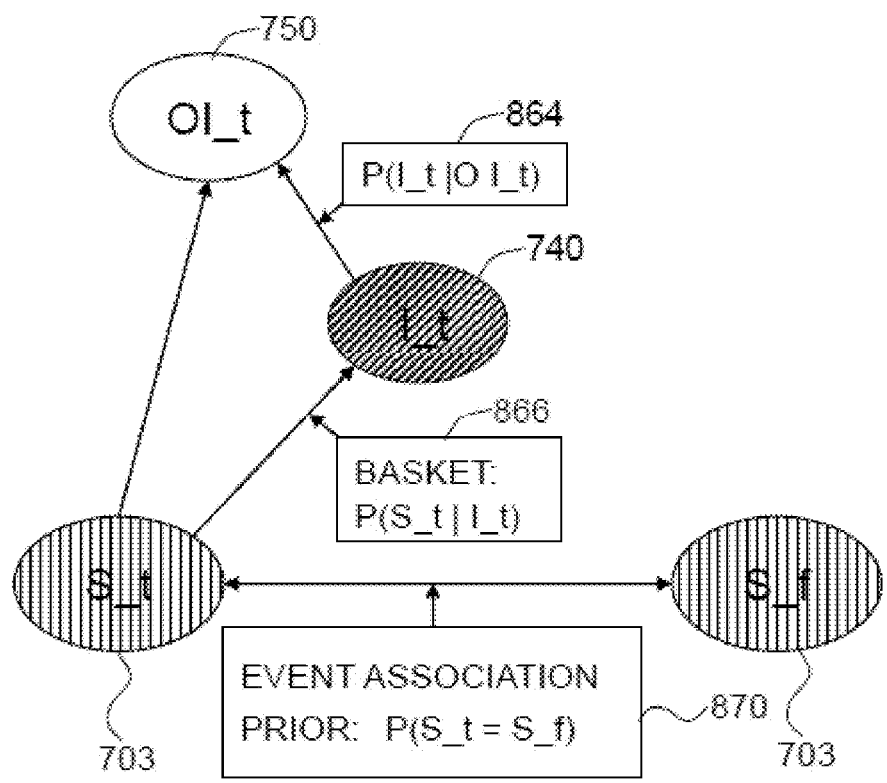
FIG. 16 shows an exemplary embodiment of the Bayesian model of the time constraint between purchase events and the checkout events.

FIG. 16 shows an exemplary embodiment of the Bayesian model of the time constraint between the purchase events 771 and the checkout events 781. The probabilistic structure of the purchase event at time t can be related to a checkout event 780, when these events were generated from the same shopper. Because there is uncertainty whether that is the case or not, a probability density can encode the uncertainty. Previously, each checkout event 780 was incorporated to the item-event matrix 830 and the event association matrix 834 as an event with purchase item 'F'. In the same framework, the potential relation between the checkout event 780 and any purchase event 770 can be represented by the event association prior 870 P(S_t=S_u).

Figure 17:
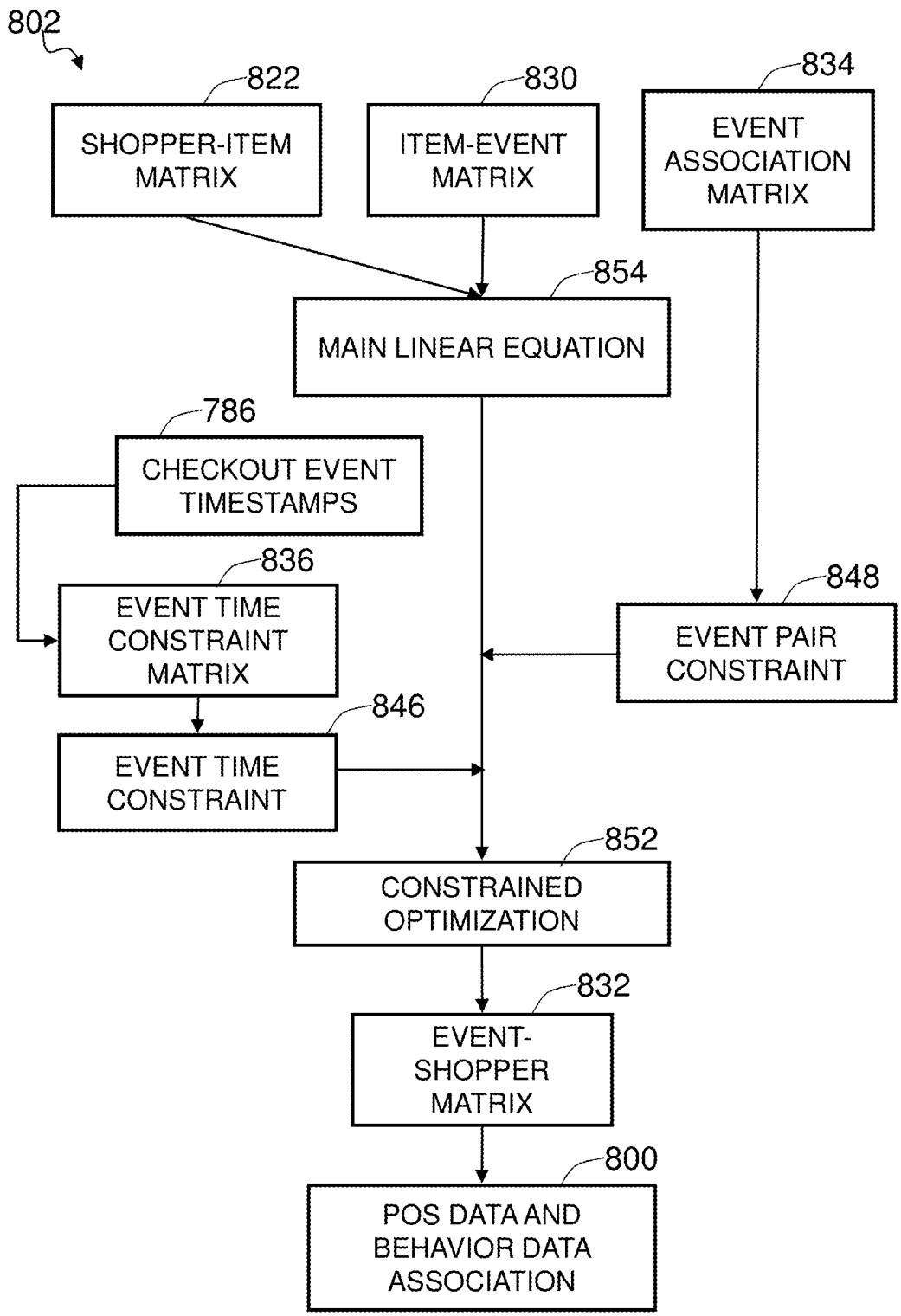
FIG. 17 shows an exemplary embodiment of the POS data and behavior data association method.

FIG. 17 shows an exemplary embodiment of the POS data and behavior data association method 802. The primary basis of this embodiment is the stated algebraic relation among the item-shopper matrix 822, the item-event matrix 830, and the event-shopper matrix 832 (which is the solution of the problem). Under an ideal scenario where each of the purchase items is unique within a given time frame, the linear solution to this algebraic equation will produce a unique solution.

Under realistic conditions, different shoppers may purchase the same item within a short period of time. Therefore, other constraints from basket data and behavior analysis data are necessary to resolve the ambiguity. The constraints comprise distance between items, distance between the closest item in the basket to the checkout register, and shoppers' appearance. These constraints are formulated in algebraic form to be added to the main linear equation 854 of the item-shopper matrix 822, the item-event matrix 830, and the event-shopper matrix 832 of unknown variables. The distance between items constrain is represented as $$DistFit_j = \sum_{i,k \neq i} \text{time\_dist\_measure}\{(item_{ij}, item_{kj}), (time_{ij}, time_{kj})\}.$$

The distance between the closest item in the basket to the checkout register constraint is represented as LastStopFit$_j$=min dist(pos$_{ij}$,registet$_{ij}$). The shoppers' appearance constraint is represented as $$VisualFit_j = \sum_{i,k \neq i} \text{difference}(visual_{ij}, visual_{kj}).$$

The event time constraint 846 demands that, first, each event that a shopper has generated before coming to the checkout should have happened prior to the arrival, and second, that these events should have happened within a reasonable time frame. The constraint is derived from the checkout event timestamps 786, and is implemented via the event time constraint matrix 836. In algebraic terms, the first constraint requires that the entire non-zero element in each column of the event-shopper matrix should come before the fixed checkout event. The assignment of the time constraint parameters is represented by ep$_{ij}$→(item$_{ij}$, pos$_{ij}$,time$_{ij}$,visual$_{ij}$) where item$_{ij}$ represents an item-shopper correspondence, pos$_{ij}$ represents position parameters, time$_{ij}$ represents the event time parameters, and visual$_{ij}$ represents appearance parameters. The second constraint can be enforced by assigning penalties to a candidate events assignment that has an unreasonably long time span relative to the number of checkout items. The second constraint can be implemented in a way that considers the number of items in the checkout basket; the time window should allow a longer time span for purchase events that have many items at the checkout.

The event pair constraint 848 is derived from the shopper tracks 716, and is implemented in the form of event association matrix 834.

These constraint terms are added to the main linear equation 854, and the resulting equation constitutes a constrained optimization problem 852. The constrained optimization problem 852 is $$\min_{ep}\left[\sum_{ij}\left\{ip_{ij} - \sum_k ie_{ik}ep_{kj}\right\}^2 + \alpha\sum_j DistFit_j + \beta\sum_j LastStopFit_j + \lambda\sum_j VisualFit_j \right] \text{ where } \{ep_{kj}\}$$

represents the event-shopper matrix 832, {ip$_{ij}$} represents the item-shopper matrix 822, {ie$_{ik}$} represents the item-event matrix 830, $$\alpha\sum_j DistFit_j$$

represents a distance between items constraint, $$\beta\sum_j LastStopFit_j$$

represents a constraint of distance between the closest item in the basket to the checkout register, and $$\lambda\sum_j VisualFit_j$$

represents me snoppers' appearance constraint. The solution to the problem is given in the form of an event-shopper matrix 832, which encodes the POS data and shopper behavior data association 800.

FIG. 18 shows an exemplary embodiment of the event time constraint matrix 836 and its application for event time constraint 846.

The constraint can be implemented via a linear form using a matrix (event time constraint matrix 836) constructed from the checkout event timestamps 786 and the likely time frame that the corresponding events could have taken place. Each row represents a shopper, and each column position represents an event. Each row has zero elements between the start time and the end time of the candidate events for that shopper, where the start time and the end time depend on the checkout time and the number of items. The rest of the positions that are outside of the permissible time range have −1, which acts as penalties. When each row of the event time constraint matrix 836 is multiplied to each column of the event-shopper matrix 832 (with candidate entries), the terms having a non-zero element within the permissible time range mandated by the event time constraint matrix 836 will not contribute to the product (equals zero). However, when some element in the event shopper matrix 832 has a non-zero value (which indicates a purchase event) outside of the range, the product will become negative. Therefore, the diagonal elements of the product matrix will represent the amount of penalty for all of the shoppers. Then the trace of the product matrix will quantify the total penalty due to the time discrepancy between the candidate events and the checkout events.

In another exemplary embodiment, the elements in the time constraint matrix 836 can have values between −1 and 1, to apply the constraint in a more gradual manner.

FIG. 19 shows an exemplary embodiment of the event pair constraint 848 implemented by the event association matrix 834.

The event pair constraint 848 represented as an event association matrix 834 can be implemented as a quadratic form. Given a candidate list of events for a shopper (a column of the event-shopper matrix 832), its matrix multiplication with the event association matrix 834 produces another vector whose non-zero elements appear at the locations of the events related by the event association matrix 834. Then the scalar product of the second vector with the original vector (the shopper column) represents the match between these two vectors. Therefore, whenever the original list of columns agrees with the event association matrix 834, the scalar product (in fact, a quadratic form defined by the event association matrix) produces maximum values; the quadratic form measures the agreement between the candidate events and the event association.

Figure 20:
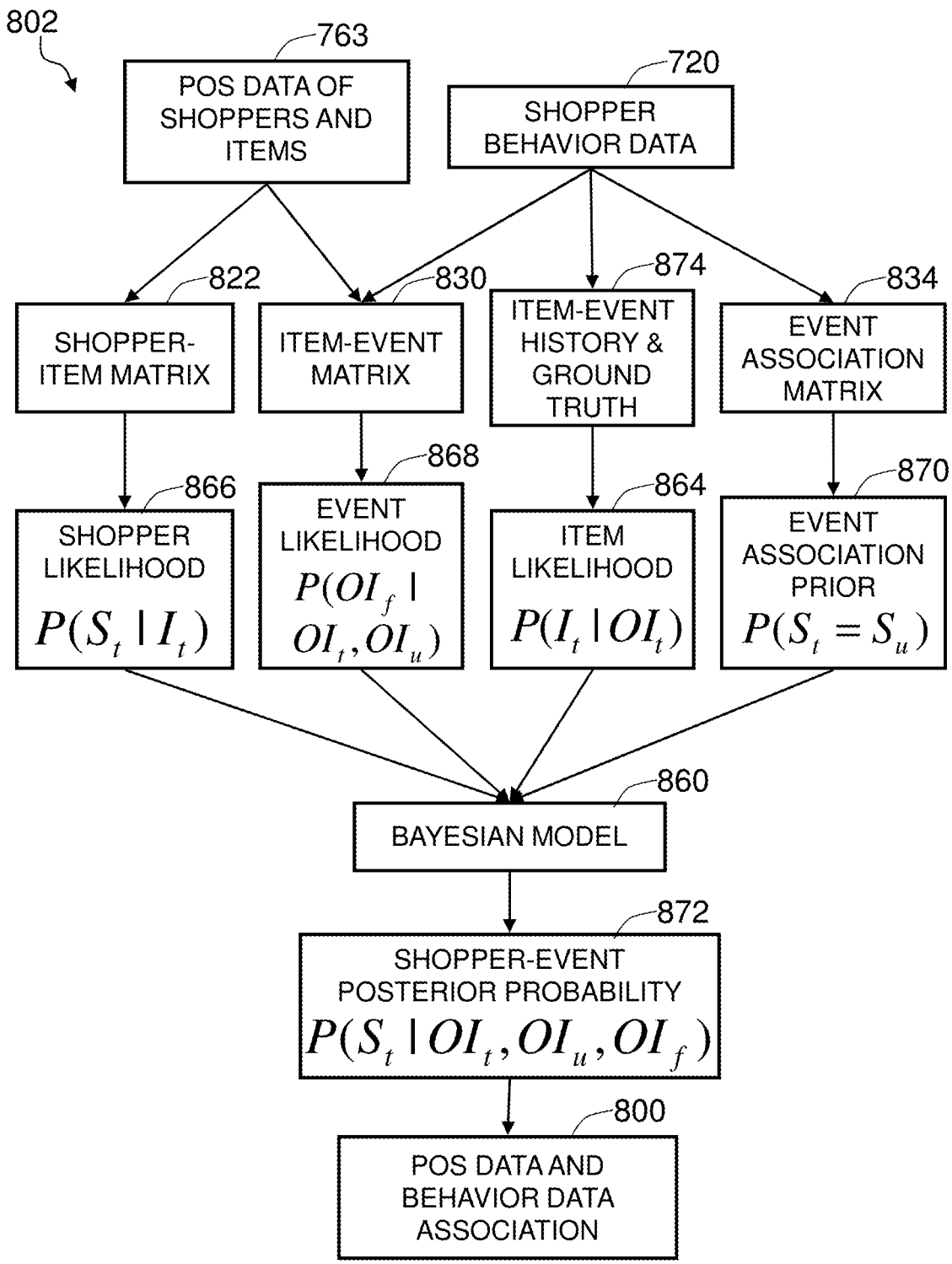
FIG. 20 shows an exemplary embodiment of the Bayesian POS data and behavior data association method.

FIG. 20 shows an exemplary embodiment of the POS data and behavior data association method 802 in Bayesian framework. From the Bayesian generative model 861, we can derive the shopper-event posterior probability 872 (given an observed purchase item 751), which produces the desired correspondence. The posterior probability is expressed in terms of the shopper likelihood 866, the event likelihood 868, the item likelihood 864, and the event association prior 870.

The shopper likelihood 866 represents the probability of whether a given shopper 700 could have purchased a given item based on the POS data of shoppers and items 763. The likelihood can be computed from the item-shopper matrix 822.

The event likelihood 868 represents the constraint between the checkout time of a given basket and the timestamps of purchase events whose items belong to the given basket. This constraint is computed from the item-event matrix 830.

The item likelihood 864 quantifies the uncertainty between the true purchase item and the observed purchase item, and is estimated from repeated observations (item-event history and ground truth 874).

The event association prior 870 represents the probability that a pair of events belongs to the same shopper, and takes its values from the event association matrix 834.

The shopper-event posterior probability 872 can be expressed by these probability densities based on the Bayesian principle:

$$P(S_t \mid OI_t, OI_u, OI_f) = \sum_{I_t, I_u, S_u} P(S_t \mid S_t - S_u, S_u, I_t, I_u, OI_t, OI_u, OI_f)$$

$$P(S_t - S_u, S_u, I_t, I_u, OI_f \mid OI_t, OI_u)$$

$$= \sum_{I_t, I_u, S_u} P(S_t \mid I_t) P(I_t \mid OI_t) P(S_t - S_u) P(S_u \mid I_u)$$

$$P(I_u \mid OI_u) P(OI_f \mid OI_t, OI_u)$$

Once the probability is computed, the shopper ID that maximizes the quantity is chosen as the shopper ID that corresponds to the observed item OI_t (t-th event), which solves the POS data and behavior association 800 problem.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

Figure 21:
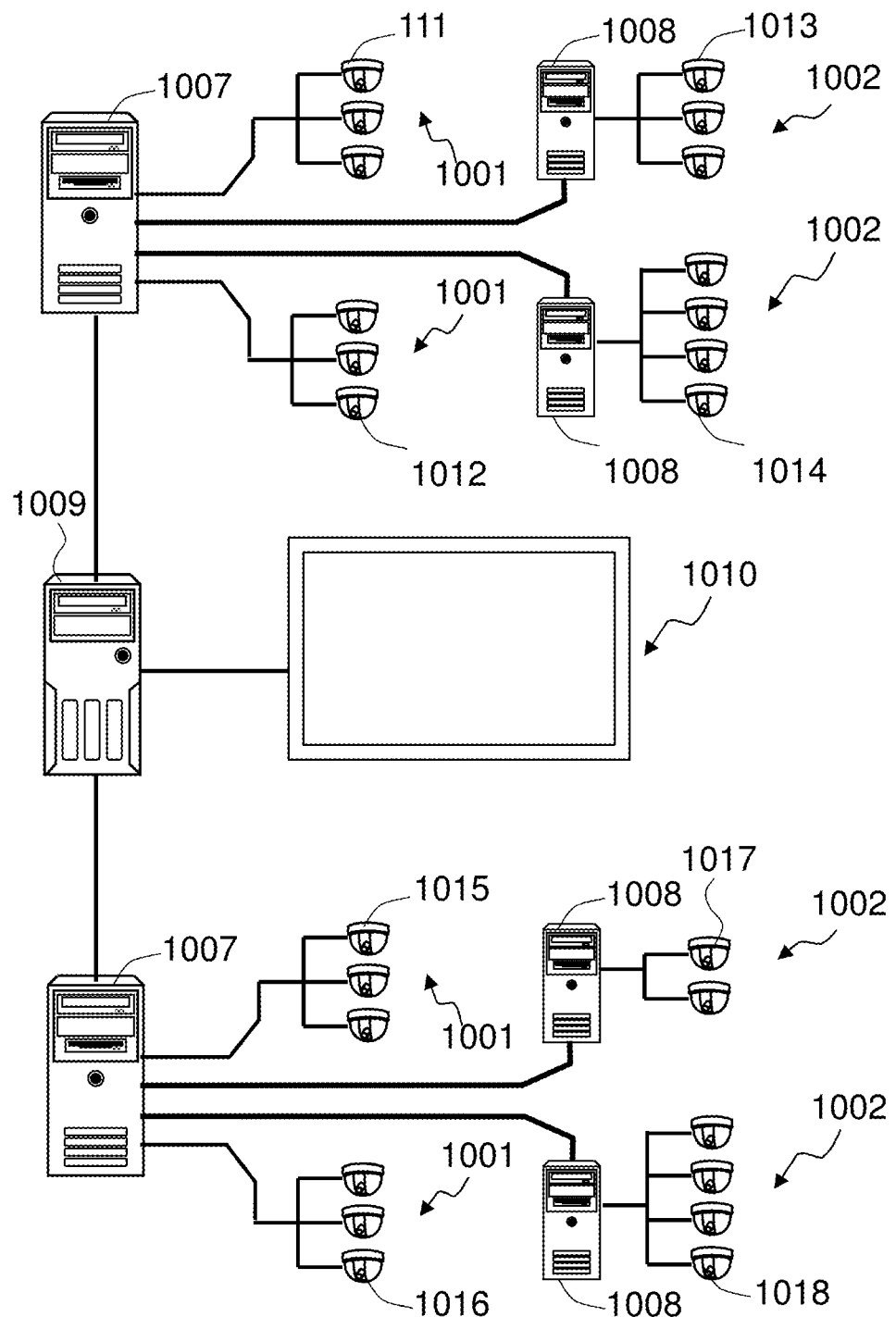
FIG. 21 shows an exemplary embodiment of a deployment of hardware components to collect data.

FIG. 21 shows an exemplary network of a plurality of means for control and processing and a plurality of means for capturing images in the present invention for a media element performance rating, where the network further consists of a plurality of first means for control and processing and a plurality of second means for control and processing, which communicate with each other to synchronize the time-stamped lists of measurement among a plurality of video streams captured by the means for capturing images in the measured locations.

The apparatus comprises means for capturing a plurality of input images of the people by at least a means for capturing images, e.g., first means for capturing images 1001 and second means for capturing images 1002, in the vicinity of the media element, and means for processing the plurality of input images, e.g., first means for control and processing 1007 or second means for control and processing 1008. The first means for control and processing 1007 or second means for control and processing 1008 may be used as the exemplary embodiment of these means for aggregating the measurements and means for calculating a set of ratings.

In the exemplary embodiment, a plurality of means for capturing images, e.g., a plurality of first means for capturing images 1001, are connected to the means for video interface in a means for control and processing, e.g., a first means for control and processing 1007.

The sensors are placed in a distributed architecture to facilitate the measurement of the point of purchase data. For example, in the exemplary embodiment shown in FIG. 21, a plurality of first means for capturing images 1001, such as a "means for capturing images 1" 1011 and a "means for capturing images 2" 1012, are connected to the means for video interface in a first means for control and processing 1007 that is different from the first means for control and processing 1007 of another plurality of first means for capturing images 1001, such as a "means for capturing images 5" 1015 and a "means for capturing images 6" 1016.

In an exemplary deployment of the system that embodies the present invention, the first means for capturing images 1001 can be installed where the field-of-view can cover the traffic of the people in the measured location and the second means for capturing images 1002 can be installed in the vicinity of a media element in the location for the close view of the people. The means for capturing images are connected to the means for video interface through cables.

The digitized video data from the means for video interface is transferred to the means for control and processing that executes computer vision algorithms on the data. The means for control and processing can have internal means for storing data or external means for storing data. The means for control and processing can also display data on a display screen 1010 for use by retailers or manufacturers to analyze the relationship between points of purchase and points of sale.

The means for capturing images can comprise an analog camera, USB camera, or Firewire™ camera. The means for video interface, which can comprise a video frame grabber, USB interface, or Firewire™ interface, are typically included in the same enclosure as the means for control and processing. The means for control and processing can be a general purpose personal computer, such as a Pentium® 4 PC, or a dedicated hardware, such as a FPGA-based implementation of a device, which can carry out the required computation. The means for control and processing, as well as the means for video interface, can be placed locally or remotely, as long as the connection to the means for capturing images can be established.

The internal means for storing data, such as internal hard disk drives, is placed within the same enclosure as the means for control and processing. The external means for storing data, such as a network storage driver or internal hard disk drives contained in a remote computer, can be placed locally or remotely, as long as a means for transferring data is available.

We claim:

1. A method for finding correspondence between retail point-of-sale data and shopper behavior data along with shopper track data from video observation, comprising the following steps of:
   a) constructing a relational database of purchase items versus shoppers from the point-of-sale data,
   b) collecting images of shoppers using cameras with fields of view at point-of-purchase,
   c) triggering proximity and foreground object analysis of the images based on shopper orientation and time-based behavior detection,
   d) running video analysis on the images to track the body and hands of shoppers using a computer,
   e) calculating the shopper behavior data based on information from tracking the shoppers, processed by the shopper behavior analysis module,
   f) constructing a relational database of purchase items versus purchase events from the shopper behavior data,
   g) incorporating event association constraints,
   h) incorporating event time constraints using a linear equation, wherein the linear equation comprises a matrix that encodes relations between the purchase events and shoppers and a matrix that encodes time relations between the purchase events and checkout events, wherein the linear equation is $$\min_{ep}\left[\sum_{ij}\left\{ip_{ij} - \sum_{k}ie_{ik}ep_{kj}\right\}^2\right] +$$

$$\alpha \sum_{j} DistFit_j + \beta \sum_{j} LastStopFit_j + \lambda \sum_{j} VisualFit_j$$

wherein $$\min_{ep}\left[\sum_{ij}\left\{ip_{ij} - \sum_{k}ie_{ik}ep_{kj}\right\}^2\right]$$

represents an optimization problem for determining a likely event-person matrix, $$\alpha \sum_{j} DistFit_j$$

represents a constraint of distance between items, $$\beta \sum_{j} LastStopFit_j$$

represents a constraint of distance between a closest item in a basket to a checkout register, and $$\lambda \sum_{j} VisualFit_j$$

represents a constraint of the appearance of a shopper,
   i) setting up a relational database of purchase events versus shoppers as unknown variables representing a correspondence,
   j) building a correspondence equation based on the relational database of purchase items versus shoppers, the relational database of purchase items versus purchase events, and the relational database of purchase events versus shoppers, and the shopper track data,
   k) solving the correspondence equation to find correspondence data, and
   l) displaying correspondence data on a display screen to analyze the relationship the retail point-of-sale data and the shopper behavior data for the purpose of a media element rating system.

2. The method according to claim 1, wherein the method further comprises a step of constructing the relational database of purchase items versus shoppers using a matrix,
   wherein each row of the matrix represents a shopper, each column of the matrix represents a purchase item, and a non-zero value in an item and shopper entry of the matrix represents the purchase of the item by the shopper.

3. The method according to claim 1, wherein the method further comprises a step of constructing the relational database of purchase items versus purchase events using a matrix,
   wherein each row of the matrix represents a purchase item, each column of the matrix represents a purchase event, and a non-zero value in an item and event entry of the matrix represents the purchase of the item at the purchase event.

4. The method according to claim 1, wherein the method further comprises a step of setting up data from the relational database of purchase events versus shoppers as unknown variables,
   wherein the variables comprise a matrix where each row of the matrix represents a purchase event, each column of the matrix represents a shopper, and a non-zero value in an event and shopper entry of the matrix represents the occurrence of the purchase event caused by the shopper.

5. The method according to claim 1, wherein the method further comprises a step of constructing a matrix that constrains event time, wherein each row of the matrix represents a shopper and zero elements in the row represent start time and end time of the purchase events.

6. The method according to claim 1, wherein the method further comprises a step of constructing a matrix that constrains event time, wherein a permissible time range depends on the number of checkout items, wherein the number of checkout items is algebraically represented as $$NumItem_j = \sum_i ip_{ij},$$

wherein $NumItem_j$ is the number of checkout items and $$\sum_i ip_{ij}$$

represents the sum of items associated with a single shopper.

7. The method according to claim 1, wherein the method further comprises a step of incorporating event association constraints using a matrix, wherein each entry of the matrix represents a relation between corresponding purchase events based on the shopper track data.

8. The method according to claim 1, wherein the method further comprises a step of incorporating event association constraints using a quadratic form, wherein the quadratic form comprises a matrix that encodes relations between the purchase events and shoppers and a matrix that encodes associations among purchase events by shopper tracks.

9. The method according to claim 1, wherein the method further comprises a step of utilizing probability distributions to represent data in the relational database and uncertainties in the data, utilizing a Bayesian formula to compute a posterior probability density of shoppers given observed purchase items.

10. The method according to claim 9, wherein the method further comprises a step of utilizing probabilistic likelihood of purchase items purchased by the shoppers to represent the relational database of purchase items versus shoppers, wherein the probabilistic likelihood is represented as $P(S_t|I_t)$, wherein $S_t$ represents a shopper and $I_t$ represents an item.

11. The method according to claim 9, wherein the method further comprises a step of utilizing probabilistic likelihood of true purchase items given observed purchase items at the purchase events to represent the relational database of purchase items versus purchase events wherein the probabilistic likelihood is represented as $P(OI_j|OI_t, OI_u)$ wherein $OI_j$, $OI_t$, $OI_u$ are observed purchase items.

12. The method according to claim 9, wherein the method further comprises a step of utilizing probabilistic likelihood of true purchase items given observed purchase items that is computed from a historical data of true purchase items and observed purchase items, wherein the probabilistic likelihood is represented as $P(I_t|OI_t)$ wherein $I_t$ is a true purchase item and $OI_t$ is an observed true purchase item.

13. The method according to claim 9, wherein the method further comprises a step of utilizing probabilistic likelihood of checkout events and purchase events belonging to a same shopper as an event time constraint.

14. The method according to claim 9, wherein the method further comprises a step of utilizing probability that any pair of purchase events belong to a same shopper as an event association constraint, wherein the probabilistic likelihood is represented as $P(S_t=S_u)$, wherein $S_t$ is a shopper of a first event and $S_u$ is a shopper of a second event.

15. An apparatus for finding correspondence between retail point-of-sale data and shopper behavior data along with shopper track data from video observation, comprising:
   a) video cameras at point-of-purchase for collecting images of shoppers in each field of view,
   b) a computer and a shopper behavior analysis module that perform the following steps of:
      i. constructing a relational database of purchase items versus shoppers from the point-of-sale data,
      ii. collecting images of shoppers using cameras with fields of view at point-of-purchase,
      iii. triggering proximity and foreground object analysis of the images based on shopper orientation and time-based behavior detection,
      iv. running video analysis on the images to track the body and hands of shoppers,
      v. calculating the shopper behavior data based on information from tracking the shoppers, processed by the shopper behavior analysis module,
      vi. constructing a relational database of purchase items versus purchase events from the shopper behavior data,
      vii. incorporating event association constraints,
      viii. incorporating event time constraints using a linear equation, wherein the linear equation comprises a matrix that encodes relations between the purchase events and shoppers and a matrix that encodes time relations between the purchase events and checkout events, wherein the linear equation is $$\operatorname*{Min}_{ep}\left[\sum_{ij}\left\{ip_{ij} - \sum_k ie_{ik}ep_{kj}\right\}^2\right] + \alpha\sum_j DistFit_j + \beta\sum_j LastStopFit_j + \lambda\sum_j VisualFit_j$$

wherein $$\operatorname*{Min}_{ep}\left[\sum_{ij}\left\{ip_{ij} - \sum_k ie_{ik}ep_{kj}\right\}^2\right]$$

represents an optimization problem for determining a likely event-person matrix, $$\alpha\sum_j DistFit_j$$

represents a constraint of distance between items, $$\beta\sum_j LastStopFit_j$$

represents a constraint of distance between a closest item in a basket to a checkout register, and $$\lambda\sum_j VisualFit_j$$

represents a constraint of the appearance of a shopper,
      ix. setting up a relational database of purchase events versus shoppers as unknown variables representing a correspondence, x. building a correspondence equation based on the relational database of purchase items versus shoppers, the relational database of purchase items versus purchase events, the relational database of purchase events versus shoppers, and the shopper track data, xi. solving the correspondence equation to find the correspondence, and xii. displaying correspondence data on a display screen to analyze the relationship the retail point-of-sale data and the shopper behavior data for the purpose of a media element rating system.

16. The apparatus according to claim 15, wherein the apparatus further comprises a computer that performs a step of constructing the relational database of purchase items versus shoppers using a matrix, wherein each row of the matrix represents a shopper, each column of the matrix represents a purchase item, and a non-zero value in an item and shopper entry of the matrix represents the purchase of the item by the shopper.

17. The apparatus according to claim 15, wherein the apparatus further comprises a computer that performs a step of constructing the relational database of purchase items versus purchase events using a matrix, wherein each row of the matrix represents a purchase item, each column of the matrix represents a purchase event, and a non-zero value in an item and event entry of the matrix represents the purchase of the item at the purchase event.

18. The apparatus according to claim 15, wherein the apparatus further comprises a computer that performs a step of setting up data from the relational database of purchase events versus shoppers as unknown variables, wherein the variables comprise a matrix where each row of the matrix represents a purchase event, each column of the matrix represents a shopper, and a non-zero value in an event and shopper entry of the matrix represents the occurrence of the purchase event caused by the shopper.

19. The apparatus according to claim 15, wherein the apparatus further comprises a computer that performs a step of constructing a matrix that constrains event time, wherein each row of the matrix represents a shopper and zero elements in the row represent start time and end time of the purchase events.

20. The apparatus according to claim 15, wherein the apparatus further comprises a computer that performs a step of constructing a matrix that constrains event time, wherein a permissible time range depends on the number of checkout items, wherein the number of checkout items is algebraically represented as $$NumItem_j = \sum_i ip_{ij},$$

wherein $NumItem_j$ is the number of checkout items and $$\sum_i ip_{ij}$$

represents the sum of items associated with a single shopper.

21. The apparatus according to claim 15, wherein the apparatus further comprises a computer that performs a step of incorporating event association constraints using a matrix, wherein each entry of the matrix represents a relation between corresponding purchase events based on the shopper track data.

22. The apparatus according to claim 15, wherein the apparatus further comprises a computer that performs a step of incorporating event association constraints using a quadratic form, wherein the quadratic form comprises a matrix that encodes relations between the purchase events and shoppers and a matrix that encodes associations among purchase events by shopper tracks.

23. The apparatus according to claim 15, wherein the apparatus further comprises a computer that performs a step of utilizing probability distributions to represent data in the relational database and uncertainties in the data, utilizing Bayesian formula to compute the posterior probability density of shoppers given observed purchase items.

24. The apparatus according to claim 23, wherein the apparatus further comprises a computer that performs a step of utilizing probabilistic likelihood of purchase items purchased by the shoppers to represent the relational database of purchase items versus shoppers, wherein the probabilistic likelihood is represented as $P(S_t|I_t)$, wherein $S_t$ represents a shopper and $I_t$ represents an item.

25. The apparatus according to claim 23, wherein the apparatus further comprises a computer that performs a step of utilizing probabilistic likelihood of true purchase items given observed purchase items at the purchase events to represent the relational database of purchase items versus purchase events.

26. The apparatus according to claim 23, wherein the apparatus further comprises a computer that performs a step of utilizing probabilistic likelihood of true purchase items given observed purchase items that is computed from a historical data of true purchase items and observed purchase items, wherein the probabilistic likelihood is represented as $P(I_t|OI_t)$ wherein $I_T$ is a true purchase item and $OI_t$ is an observed true purchase item.

27. The apparatus according to claim 23, wherein the apparatus further comprises a computer that performs a step of utilizing probabilistic likelihood of checkout events and purchase events belonging to a same shopper as an event time constraint.

28. The apparatus according to claim 23, wherein the apparatus further comprises a computer that performs a step of utilizing probability that any pair of purchase events belong to a same shopper as an event association constraint, wherein the probabilistic likelihood is represented as $P(S_t=S_u)$, wherein $S_t$ is a shopper of a first event and $S_u$ is a shopper of a second event.

* * * * *